(12) United States Patent
Ho et al.

(10) Patent No.: US 7,870,342 B2
(45) Date of Patent: *Jan. 11, 2011

(54) LINE CACHE CONTROLLER WITH LOOKAHEAD

(75) Inventors: Son Ho, Los Altos, CA (US); Kevin Tonthat, San Jose, CA (US); Hai Van, San Jose, CA (US); Joseph Sheredy, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1492 days.

This patent is subject to a terminal disclaimer.

(21) Appl. No.: 10/646,289

(22) Filed: Aug. 21, 2003

(65) Prior Publication Data
US 2005/0021912 A1 Jan. 27, 2005

Related U.S. Application Data

(63) Continuation-in-part of application No. 10/626,507, filed on Jul. 24, 2003, now abandoned.

(51) Int. Cl.
*G06F 12/00* (2006.01)
(52) U.S. Cl. ............... 711/137; 711/150; 711/E12.057; 710/305
(58) Field of Classification Search ........................ None
See application file for complete search history.

(56) References Cited

U.S. PATENT DOCUMENTS

| | | | |
|---|---|---|---|
| 4,008,460 A | | 2/1977 | Bryant et al. |
| 4,425,615 A | * | 1/1984 | Swenson et al. ............ 711/114 |
| 5,594,886 A | | 1/1997 | Smith et al. |
| 5,699,551 A | | 12/1997 | Taylor et al. |
| 6,014,756 A | | 1/2000 | Dottling et al. |
| 6,131,155 A | * | 10/2000 | Alexander et al. ........... 712/207 |
| 6,151,664 A | | 11/2000 | Borkenhagen et al. |
| 6,182,196 B1 | | 1/2001 | DeRoo |
| 6,601,126 B1 | * | 7/2003 | Zaidi et al. ................... 710/305 |
| 6,725,334 B2 | * | 4/2004 | Barroso et al. .............. 711/122 |
| 6,725,339 B2 | * | 4/2004 | Fu et al. ...................... 711/137 |
| 6,732,235 B1 | | 5/2004 | Krivacek et al. |
| 6,820,170 B1 | | 11/2004 | Elnathan et al. |
| 6,928,525 B1 | | 8/2005 | Ebner et al. |
| 6,931,489 B2 | | 8/2005 | DeLano et al. |

(Continued)

OTHER PUBLICATIONS

U.S. Appl. No. 10/348,091, filed Jan. 21, 2003, Urabe.

(Continued)

*Primary Examiner*—Kaushikkumar Patel

(57) ABSTRACT

A memory storage system includes a line cache including a plurality of pages. A first central processing unit (CPU) accesses data stored in the pages of the line cache. A first memory device stores data that is loaded into the line cache when a miss occurs. After an initial miss, the line cache prevents additional misses as long as the first CPU is addressing sequential memory locations of the first memory device. When the miss occurs, n pages of the line cache are loaded with data from sequential locations in the first memory device, wherein n is greater than one. When the CPU requests data from an $m^{th}$ page of the n pages in the line cache, wherein m is greater than one and less than or equal to n, the line cache loads p additional pages with data from sequential locations in the first memory device.

29 Claims, 23 Drawing Sheets

U.S. PATENT DOCUMENTS

| | | | |
|---|---|---|---|
| 7,047,387 B2 | 5/2006 | Goodsell | |
| 7,133,972 B2 * | 11/2006 | Jeddeloh | 711/137 |
| 2003/0217230 A1 | 11/2003 | Rodriguez et al. | |
| 2004/0093465 A1 | 5/2004 | Ramchandran | |
| 2004/0199718 A1 | 10/2004 | Byers et al. | |
| 2005/0021916 A1 * | 1/2005 | Loafman | 711/154 |

OTHER PUBLICATIONS

The Cache Memory Book, 2nd edition by Jim Handy, Pub. 1998, pp. 14-17, 42,47, 54-55 and 57.

Application-Driven Synthesis of Memory-Intensive Systems-on-Chip by Kirovski et al (IEEE Transactinos on Computer-aided design of integrated circuits and systems, vol. 18, No. 9, Sep. 1999, pp. 1316-1326.

Improving Direct-Mapped Cache Performance by the Addition of a Small Fully-Associative Cache and Prefetch Buffers; Norman P. Jouppi; Western Rearch Laboratory, Technical Note TN-14; Mar. 1990; 46 pages.

Adapting Cache Line Size to Application Behavior; Alexander V. Veidenbaum et al; Copyright ACM 1999 1-58113-164-x/99/06. pp. 145-154.

* cited by examiner

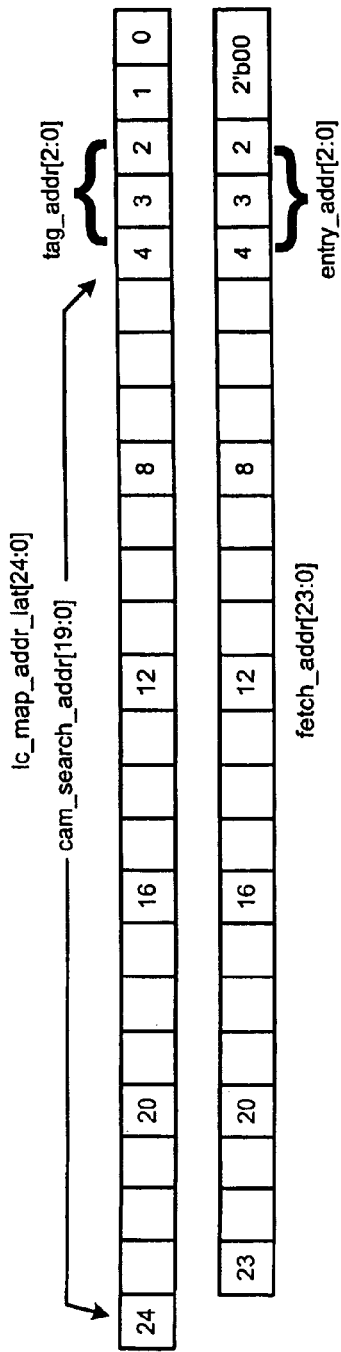
FIG. 10
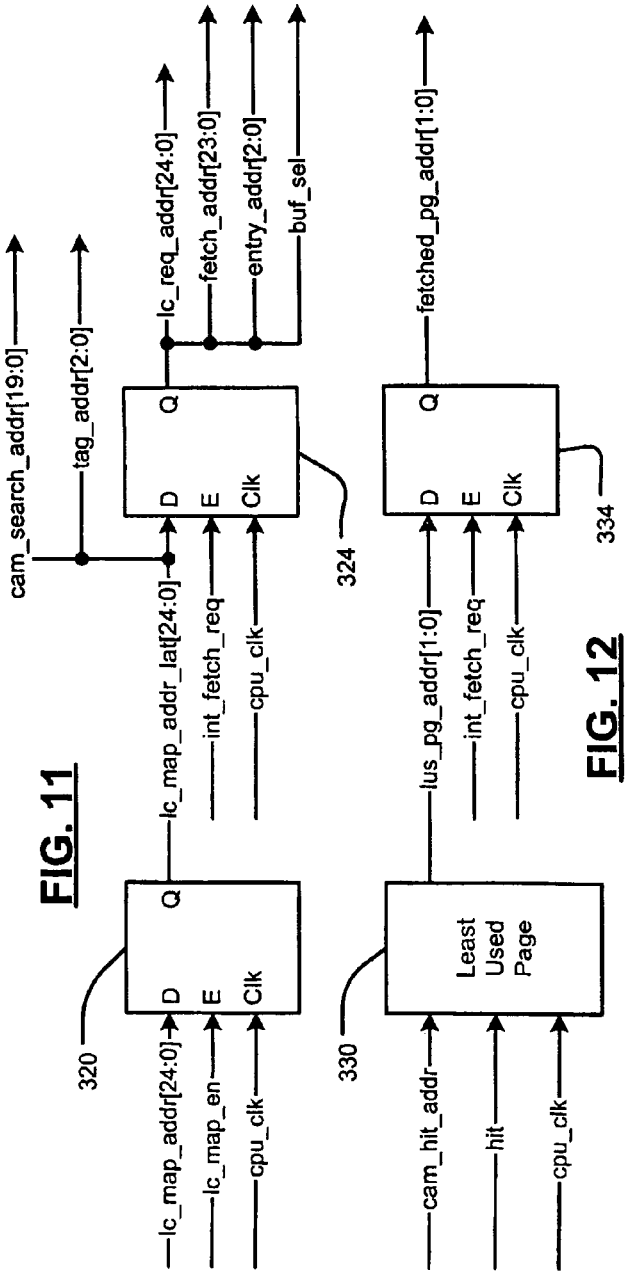
FIG. 11
FIG. 12

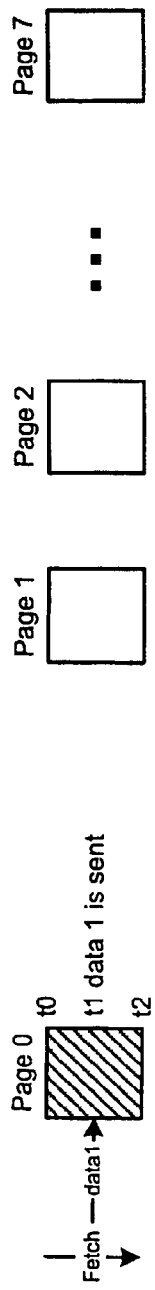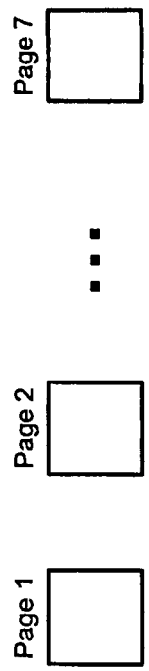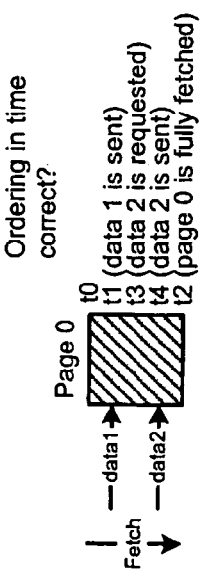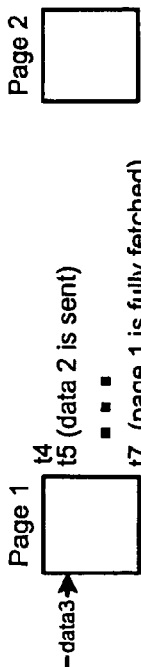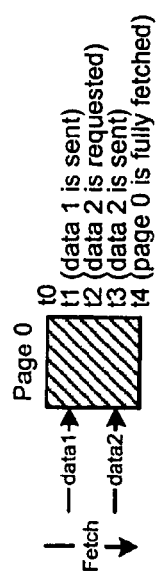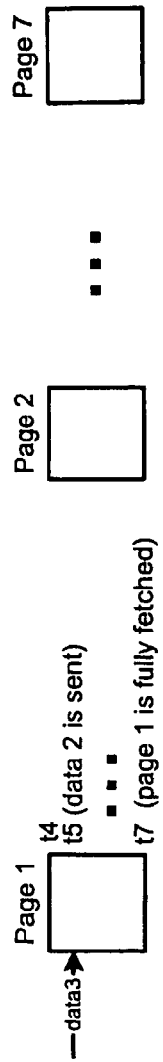
FIG. 17A
FIG. 17B
FIG. 17C
FIG. 17D

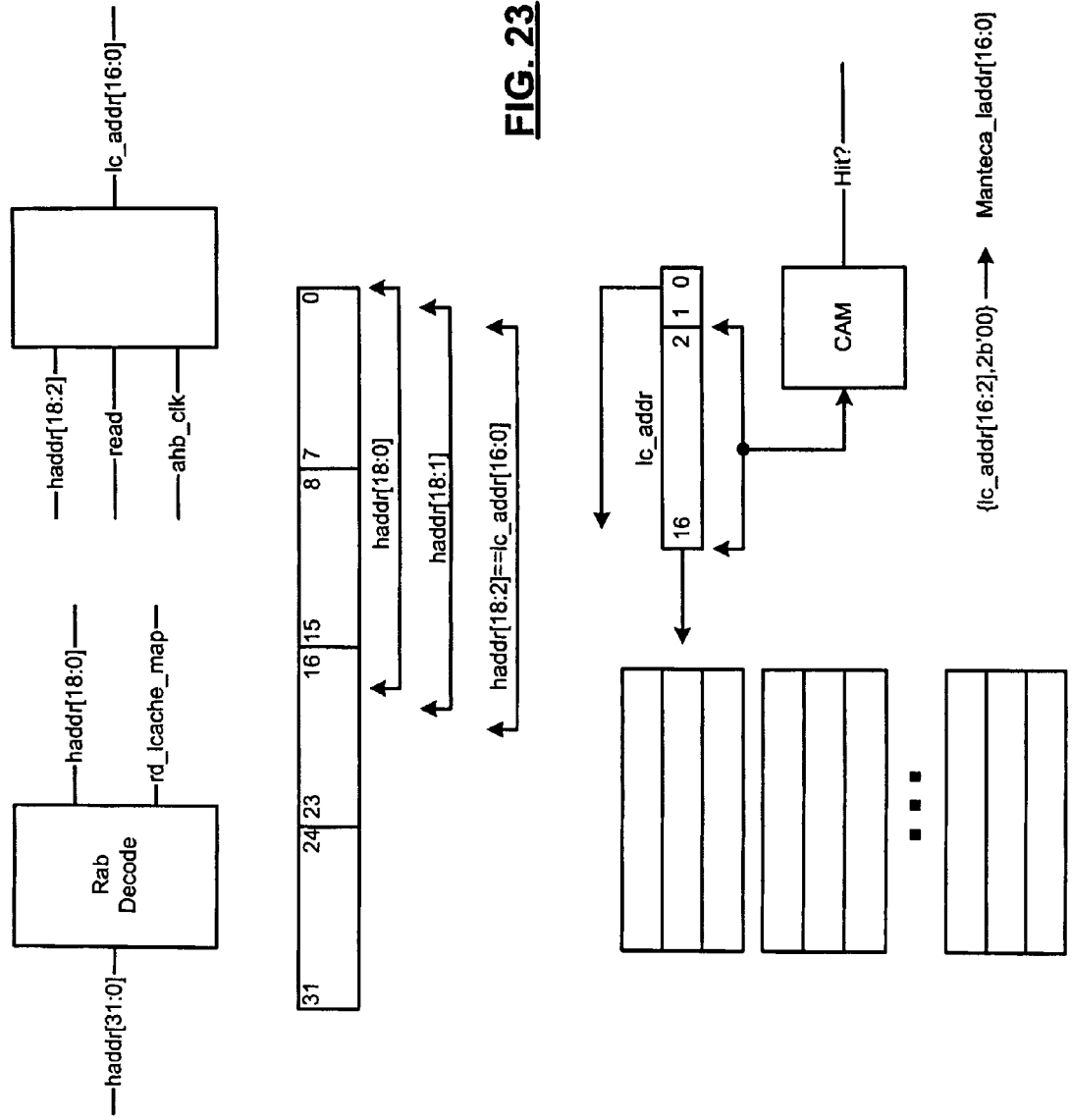

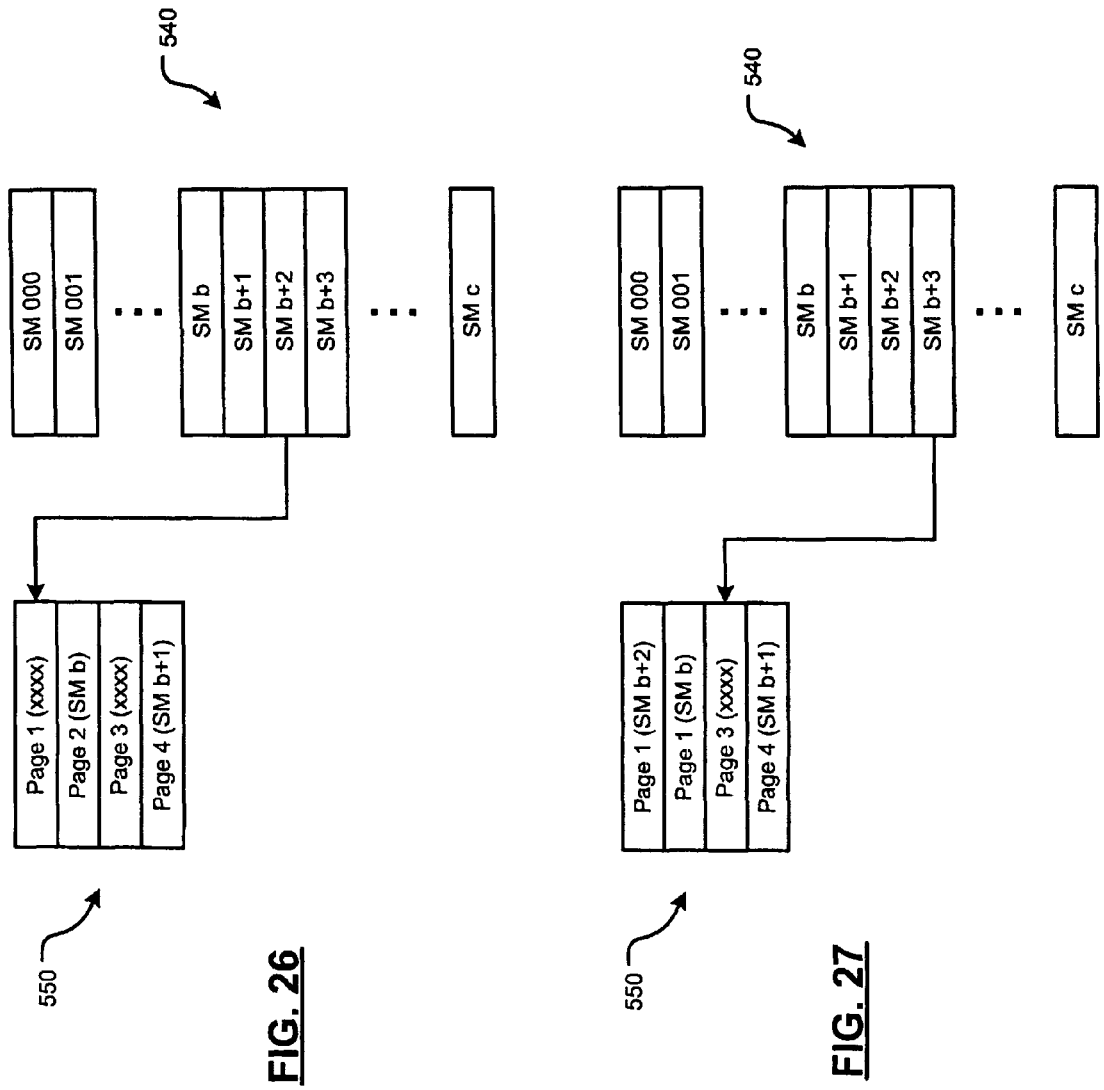

LINE CACHE CONTROLLER WITH LOOKAHEAD

CROSS-REFERENCE TO RELATED APPLICATIONS

This application is a continuation-in-part of U.S. patent application Ser. No. 10/626,507, filed on Jul. 24, 2003, which is hereby incorporated by reference in its entirety.

FIELD OF THE INVENTION

The present invention relates to line cache, and more particularly to line cache, line cache controllers and embedded processor systems.

BACKGROUND OF THE INVENTION

Cache is a special type of memory in which frequently used data values and/or instructions are duplicated to reduce latency. When requesting instructions, a central processing unit (CPU) sends a read request. If the data or instructions are located in the cache, the CPU receives the data without delay, which reduces latency. If the data or instructions are not located in cache, the data or instructions are retrieved from higher latency memory. Typically the CPU stands by while the data is retrieved directly and/or stored in cache.

SUMMARY OF THE INVENTION

A memory storage system according to the present invention includes a line cache including a plurality of pages. A first central processing unit (CPU) accesses data stored in the pages of the line cache. A first memory device stores data that is loaded into the line cache when a miss occurs. When the miss occurs, n pages of the line cache are loaded with data from sequential locations in the first memory device, wherein n is greater than one.

In other features, when the CPU requests data from an $m^{th}$ page of the n pages in the line cache, wherein m is greater than one and less than or equal to n, the line cache loads p additional pages with data from sequential locations in the first memory device.

A memory storage system according to the present invention includes a line cache including a plurality of pages. A first central processing unit (CPU) accesses data stored in the pages of the line cache. A first memory device stores data that is loaded into the line cache when a miss occurs. After an initial miss, the line cache prevents additional misses as long as the first CPU addresses sequential memory locations of the first memory device.

In other features, when the miss occurs, n pages of the line cache are loaded with data from sequential locations in the first memory device, wherein n is greater than one.

In still other features, when the CPU requests data from an $m^{th}$ page of the n pages in the line cache, wherein m is greater than one and less than or equal to n, the line cache loads p additional pages with data from sequential locations in the first memory device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 illustrates address mapping used in the line cache;

FIG. 11 illustrates an exemplary circuit for the generation of the addresses used in the line cache;

FIG. 12 illustrates an exemplary circuit used to identify a least used page;

FIGS. 17A-17D illustrate hit and miss examples for the state machine of FIG. 16;

FIG. 23 illustrates address mapping and pointer descriptions for the line cache controller of FIG. 15;

FIG. 24 is a flowchart illustrating a look ahead method according to the present invention that improves performance when a CPU requests data from sequential memory locations; and FIGS. 25-27 illustrate successive stages of one exemplary implementation of the look ahead method of FIG. 24 during a sequential memory access for an exemplary line cache with four pages.

DETAILED DESCRIPTION OF THE PREFERRED EMBODIMENTS

Figure 1:
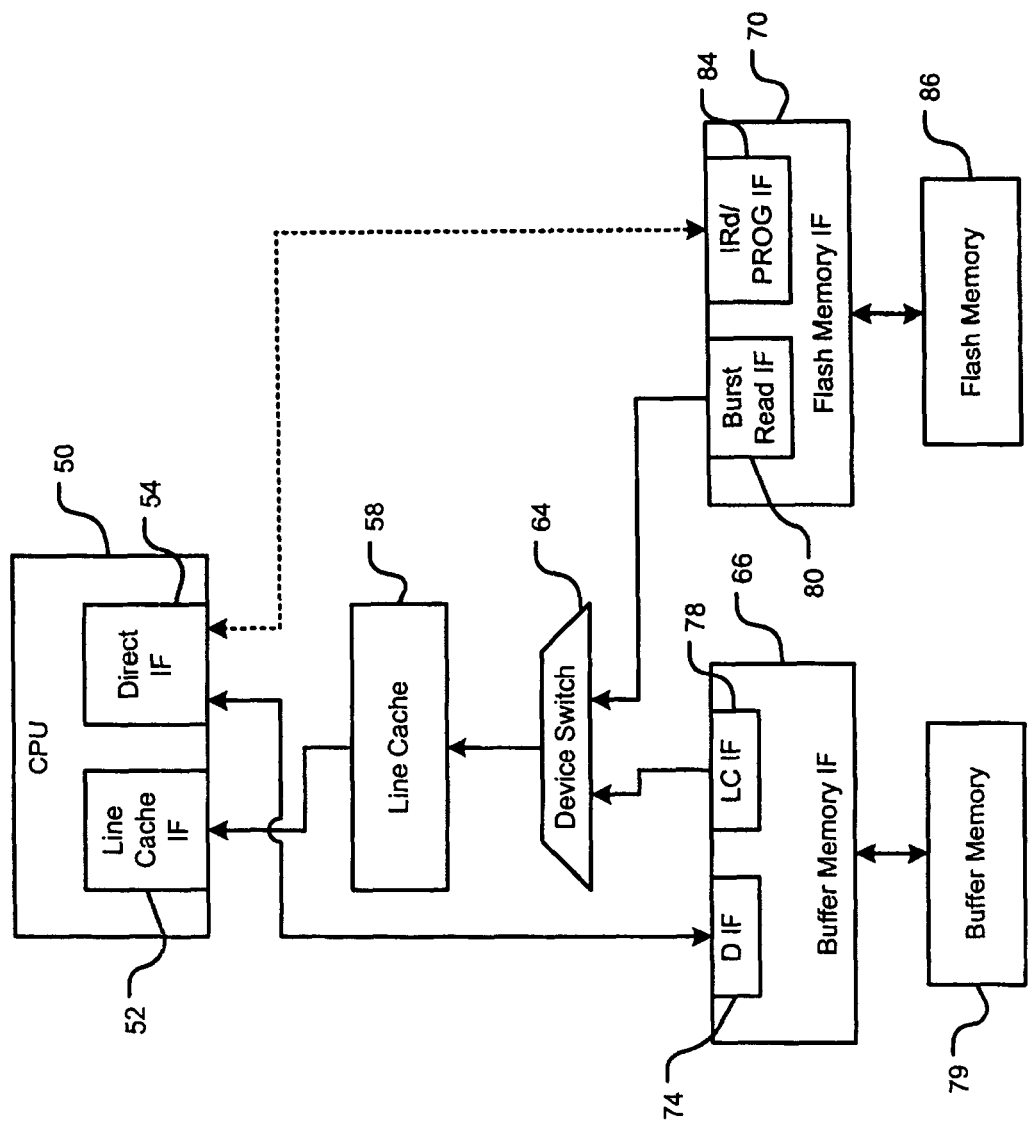
FIG. 1 is a functional block diagram of a line cache controller for multiple memory devices and a single CPU according to the present invention.

The following description of the preferred embodiment(s) is merely exemplary in nature and is in no way intended to limit the invention, its application, or uses. For purposes of clarity, the same reference numbers will be used in the drawings to identify the same elements.

A line cache controller according to the present invention allows line cache parameters such as the number of lines and pages to be changed to fit a particular application. The line cache controller also allows the same line cache to be used by one or more processors and one or more types of higher latency memory such as flash, DRAM, SDRAM, and other RAM. Exemplary processors include host and servo processors in disk drive applications, although other types of processors and applications may be used. For example, Advanced Risc Machine (ARM) processors may be used.

Referring now to FIG. 1, an embedded processor or central processing unit (CPU) 50 includes a line cache interface 52 and a direct memory interface 54. The line cache interface 52 communicates with line cache 58. A device switch 64 selects either a buffer memory interface 66 or a flash memory interface 70 based on address data output by the CPU 50.

The buffer memory interface 66 includes a direct read/write interface 74 and a line cache interface 78. The direct read/write interface 74 is connected to the direct memory interface 54 of the CPU 50. The line cache interface 78 is selectively connected by the device switch 64 to the line cache 58, as will be described below. The buffer memory interface 66 is connected to buffer memory 79.

The flash memory interface 70 includes a burst read interface 80 that is connected to the device switch 64. An Information Read/Program (IRd/PROG) interface 84 is connected to the direct memory interface 54. The flash memory interface 70 is connected to flash memory 86. The buffer memory 79 preferably includes buffer RAM such as SDRAM, DDRAM or other RAM. The flash memory 86 includes any type of flash memory. In one embodiment, the flash memory 86 is made in accordance with "Flash Memory Module", U.S. patent application Ser. No. 10/348,091, filed Jan. 21, 2003, which is commonly assigned and is hereby incorporated by reference.

The device switch 64 allows the line cache 58 to be used with both the buffer memory 79 and the flash memory 86. The direct memory interface 74 can be maintained for data access without flushing the contents of the line cache 58. The IRd/Prog interface 84 allows data to be directly read from or written to the flash memory 86. A cache address tag that is used by the CPU 50 and the line cache 58 is a virtual address for both the buffer memory 79 and flash memory 86.

Figure 2:
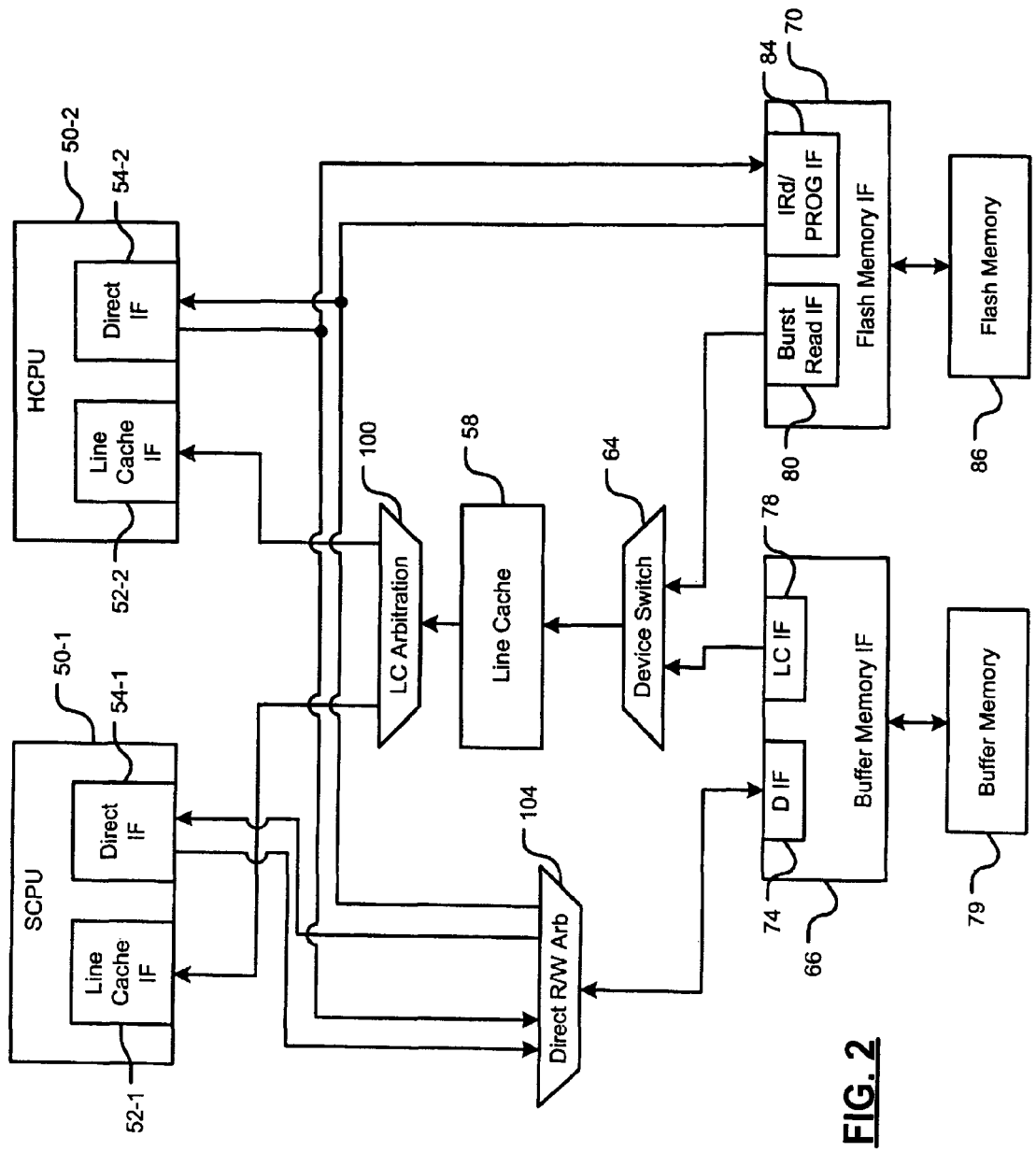
FIG. 2 is a functional block diagram of a line cache controller for multiple memory devices and multiple CPUs according to the present invention.

Referring now to FIG. 2, the line cache interfaces 52-1 and 52-2 of the host and servo CPUs 50-1 and 50-2, respectively, are connected by a line cache arbitration device 100 to the line cache 58. While host and servo processors are shown, other types of processors may be used. The line cache arbitration device 100 resolves line cache conflicts that occur between the CPUs 50-1 and 50-2, as will be described more fully below. A priority scheme may be employed. For example, in disk drive applications, the servo CPU 50-2 may have priority over the host CPU 50-1, although other priority schemes may be employed.

A direct read/write arbitration device 104 connects the direct interfaces 54-1 and 54-2 of the CPUs 50-1 and 50-2 to the buffer memory interface 66. The direct read/write arbitration device 104 resolves read/write memory access conflicts for the buffer memory 79.

The line cache arbitration device 100 allows both the host and servo CPUs 50-1 and 50-2 to retrieve data and/or code from the line cache 58. In some implementations, the line cache 58 includes 4 lines of 8×32 bits, although other numbers of cache lines and line sizes/widths can be used. The device switch 64 allows the line cache 58 to be used for both the buffer memory 79 and the flash memory 86. The direct interface 74 can be maintained for data access without flushing out the contents of the line cache 58. The IRd/Prog interface 84 allows data to be directly read from or written to the flash memory 86. A cache address tag that is used by the CPU and the line cache is a virtual address for both the buffer and flash memories, as will be described below. Cache performance is related to the number of integrated cache lines. Two small cache RAMS are less effective than one larger one. In addition, flash and buffer memory execution usually originate from separate routines, therefore concurrent execution occurs infrequently.

Increasing the number of cache lines improves the "literal pool" mechanism of advanced risc machine (ARM) processor codes when ARM processors are employed. In determining the size of the line cache 58, line size is a function of fetch size from the memory controller. Larger line sizes increase "miss-wait" time. For heavy random codes, increased miss-wait times may produce unsatisfactory performance since most of the cache fetch time is wasted. Buffer page pointers are in memory mapped (CMR) space for extendability.

Figure 3:
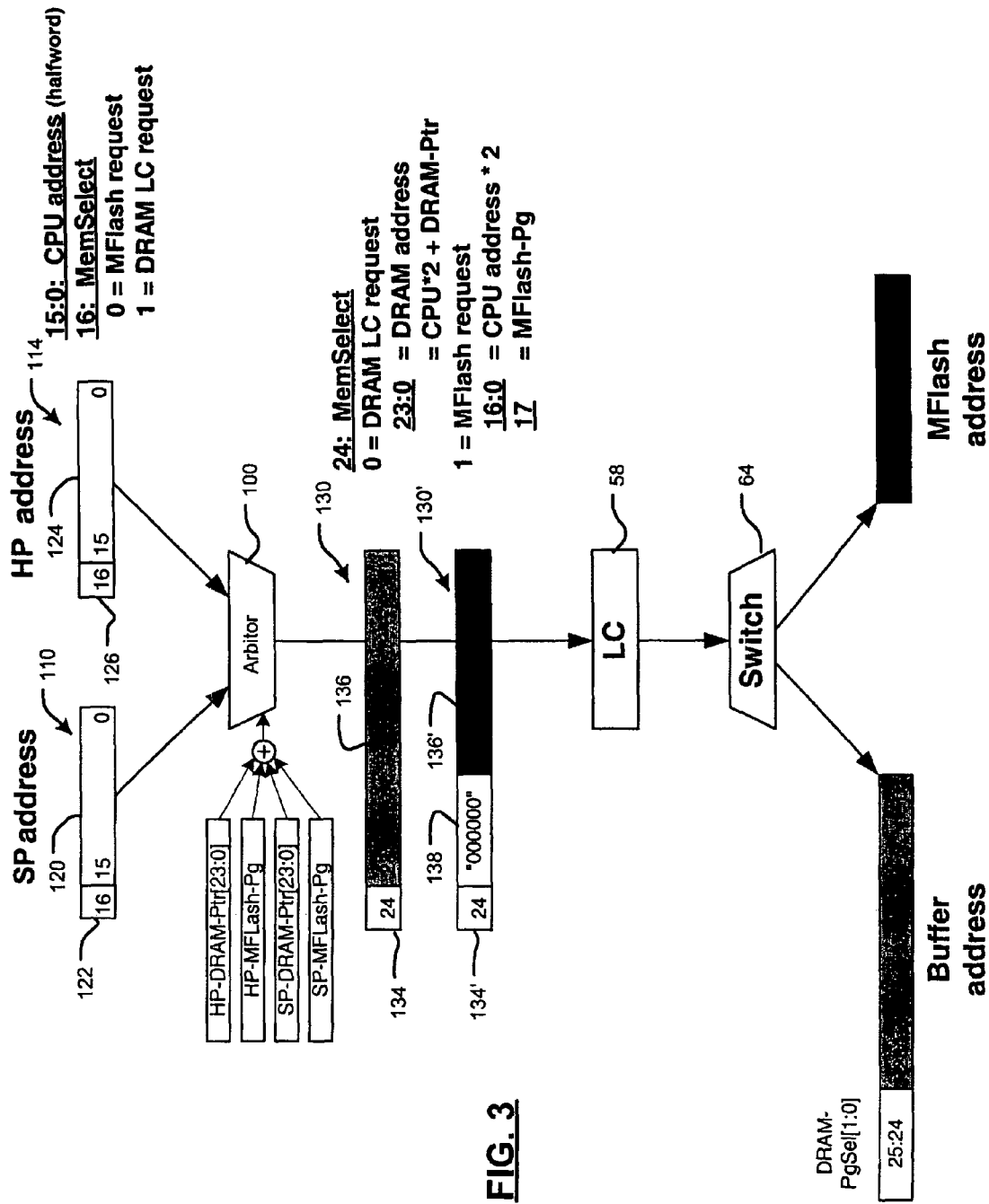
FIG. 3 illustrates virtual CPU address space for the system of FIG. 2.

Referring now to FIG. 3, virtual dual CPU addressing space for the embodiment of FIG. 2 is shown. A host CPU address 110 generated by the host CPU 50-1 is input to the line cache arbitration device 100. A servo CPU address 114 generated by the servo CPU 50-1 is also input to the line cache arbitration device 100. The arbitration device 100 selects one of the requests when two occur at the same time. The host and servo CPU addresses 110 and 114 include a first portion 120 containing a CPU address. The addresses 110 and 114 also include a memory select portion 122 containing one or more bits for selecting the target memory. For example, the first portion 120 may include bits [15:0] and the memory select portion may contain bit [16]. A first state of the memory select portions 122 and 126 selects the buffer memory 79 and a second state selects the buffer flash memory 86. The arbitration device 100 outputs a translated address 130 or 130' to the line cache 58.

When the buffer memory 79 is selected, the translated address 130 includes a memory select portion 134, which selects the buffer memory 79 as the target memory. The translated address 130 includes a second portion 136, which specifies an address in the buffer memory 79. For example, the second portion 136 may include bits [23:0], which may be mapped by multiplying the CPU address by two and adding a DRAM pointer, although other mapping techniques can be used.

When the flash memory 86 is selected, the translated address 130' includes a memory select portion 134', which selects the flash memory 86 as the target memory. A second portion 136' includes bits that specify the CPU address. For example, bits [16:0] may be used and may be mapped by multiplying the CPU address by two, although other mapping techniques may be used. Bit 17 specifies a flash page. The remaining bits 23:18 are don't care bits such as 0's or 1's or combinations thereof. For example, all 0's may be used. The device switch 64 selectively outputs the translated address 130 to the buffer memory 79 or the translated address 130' to the flash memory 86. Data that is located at the translated address is returned by the memory 79 or 86.

Figure 4:
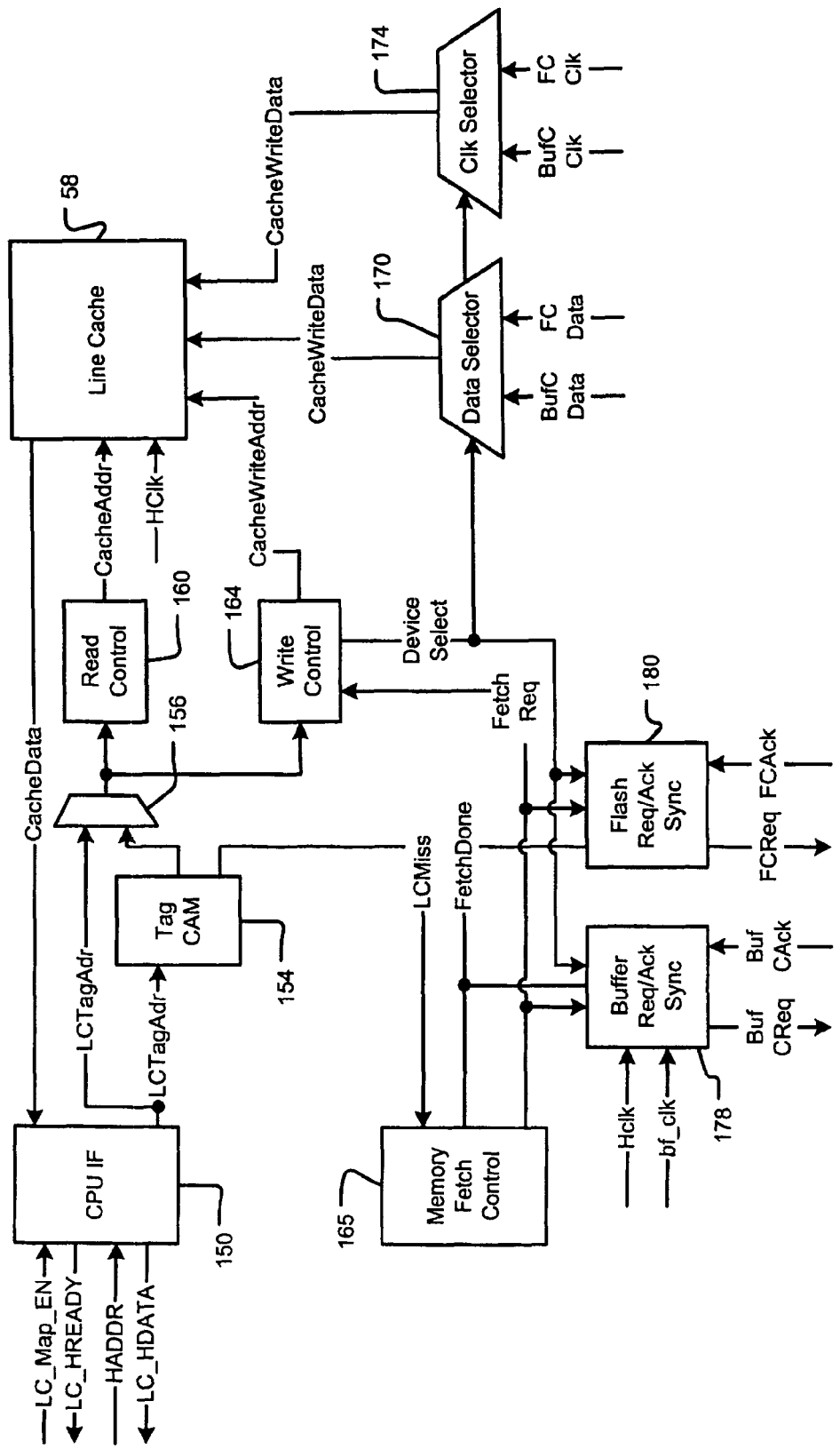
FIG. 4 is a functional block diagram illustrating the line cache controller of FIG. 1 in further detail.

Referring now to FIG. 4, line cache control logic is shown in further detail. A CPU interface 150 receives line cache map enable (LC_Map_En) and HADDR signals and generates line cache ready (LC_HREADY) and line cache data (LC_H-DATA) signals, as will be described below. The CPU interface 150 outputs a translated address LCTagAdr to a content addressable memory (CAM) 154, which stores addresses of data that is currently stored in the line cache 58. If a hit (or match) occurs, data is returned. Otherwise, a miss occurs and the CPU is stalled while data is retrieved from the buffer memory 79 or flash memory 86. The LCTagAdr and an output of the CAM 154 are input to a multiplexer 156, which has an output that is connected to read and write controllers 160 and 164. The read controller 160 outputs a cache address (CacheAddr) to the line cache 58. The line cache 58 also receives a host clock (Hclk) signal.

A memory fetch controller 165 outputs a FetchReq signal to the write controller 164 when a miss occurs. The write controller 164 outputs a CacheWriteAddr to the line cache 58 and generates a device select signal for data and clock selectors 170 and 174, respectively. The data selector 170 selectively outputs data from the buffer memory 71 (BufCData) and from the flash memory (FCData) depending upon the state of the device select signal. The clock selector 174 selectively outputs clock signals from the buffer memory (bf_clk) and from the flash memory 86 (f_clk) depending upon the state of the device select signal.

The device select signal of the write controller 164 also controls a first memory request/acknowledgement (Req/Ack) sync circuit 178 and a flash memory Req/Ack sync circuit 180. Both circuits 178 and 180 also receive the FetchReq signal from the memory fetch controller 165. The first and second memory Req/Ack sync circuits 178 and 180 generate a FetchDone signal when the memory fetch is complete.

In one embodiment, the buffer memory 79 is DRAM and generates a clock signal (bf_clk) that is asynchronous at 200 MHz max. Control logic runs host clock (AHB) at 333 MHz max. The flash memory 86 is flash memory and has a clock signal f_clk, which is divided from the host clock HClk.

Figure 5:
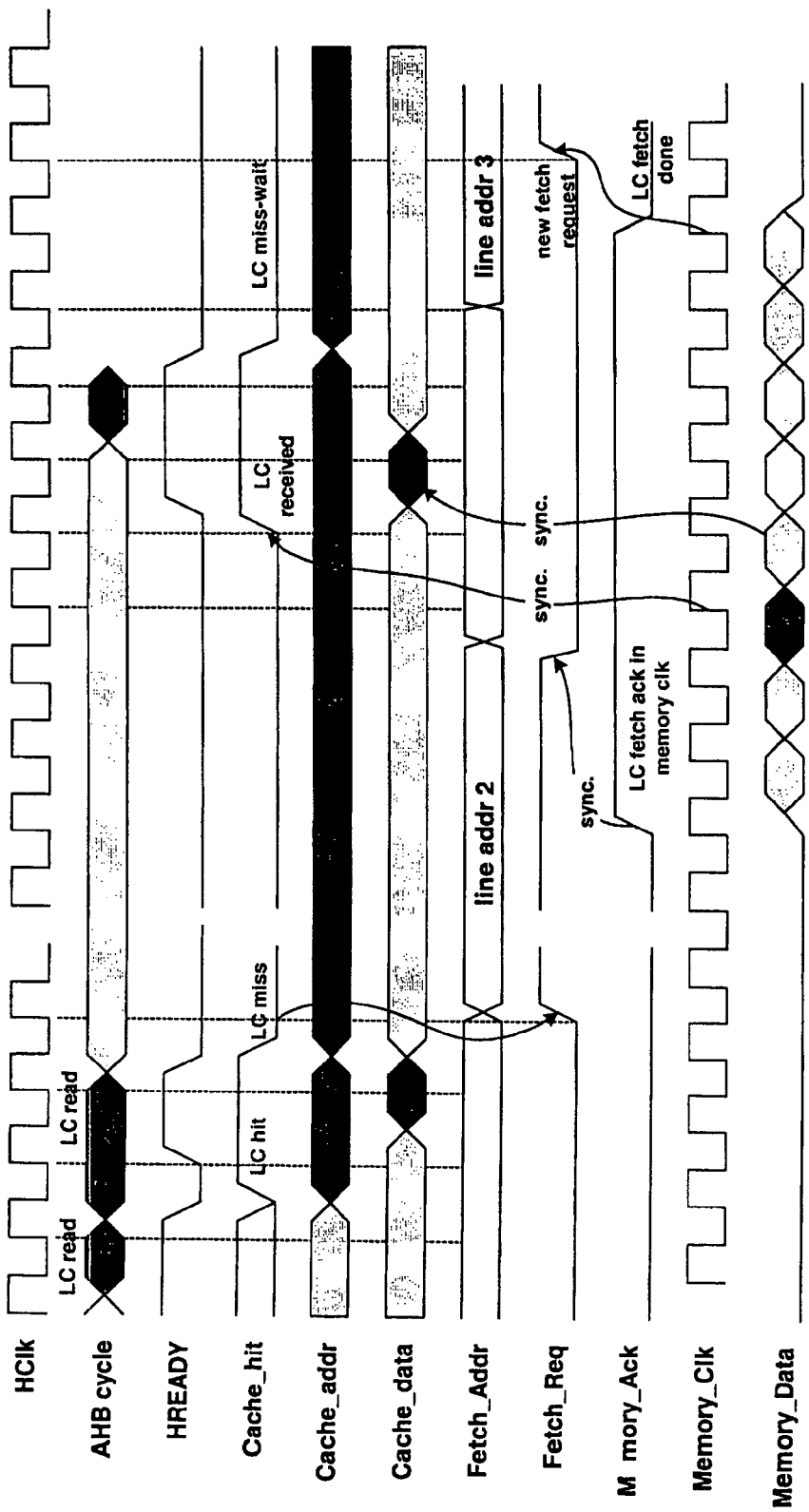
FIG. 5 are waveform diagrams illustrating control and data signals of FIG. 4.

As can be seen in FIG. 5, timing waveforms for the line cache 58 according to the present invention are shown. As can be appreciated, the line cache 58 can return a read for one page of the line cache 58 while another page of the line cache 58 is being written to. This ability to work in parallel decreases latency that is associated with the line cache 58. In addition, it can be seen that increasing the line size increases the line cache miss-wait time.

Figure 6:
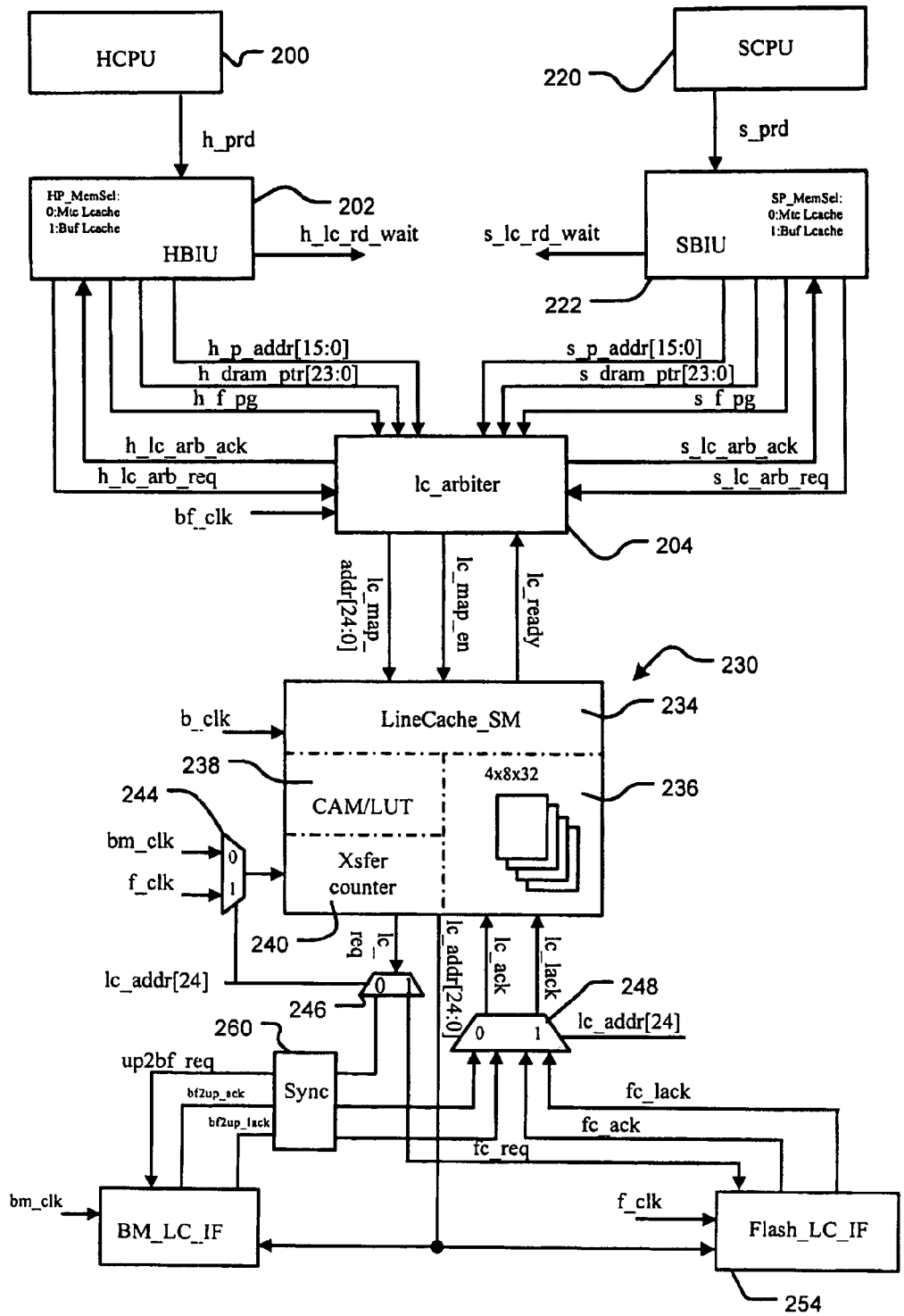
FIG. 6 is a line cache control path diagram for the line cache controller of FIG. 2.

Referring now to FIG. 6, a line cache control path diagram is shown for multiple processors. A host CPU 200 generates a host program read signal h_prd, which initiates a read request that is output to host buffer interface (HBIU) 202. The HBIU 202 also outputs a line cache arbitration request (h_lc_arb_req) to the line cache arbiter 204. The line cache arbiter 204 outputs an arbitration acknowledgement (h_lc_arb_ack) to the HBIU 202 when the CPU 200 is selected by the line cache arbiter 204. The HBIU 202 outputs a CPU address (h_p_addr [15:0]), a DRAM pointer (h_dram_ptr [23:0]), or a flash memory page (h_f_pg) to a line cache arbiter 204.

A servo CPU 220 generates a servo program read signal (s_prd), which initiates a read request that is output to a servo buffer interface (SBIU) 222. The SBIU 222 also outputs a line cache arbitration request (s_lc_arb_req) to the line cache arbiter 204. The line cache arbiter 204 outputs an arbitration acknowledgement (h_lc_arb_ack) to the SBIU 222 when the CPU 220 is selected by the line cache arbiter 204. The SBIU 222 outputs a CPU address (s_p_addr [15:0]), a DRAM pointer (s_dram_ptr [23:0]), or a flash memory page (s_f_pg) to the line cache arbiter 204.

The line cache arbiter 204 outputs a line cache map address (lc_map_addr[24:0]), which is the translated or virtual address as described above, to a line cache 230. The line cache arbiter 204 also outputs a line cache map enable (lc_map_en) signal to the line cache 230. The line cache 230 generates a line cache ready signal (lc_ready) when the line cache is ready for data access.

The line cache 230 operates in accordance with a line cache state machine 234, as will be described below. The line cache 230 includes one or more pages of line cache 236, a CAM/LUT 238 and a transfer counter 240. The line cache 230 and the line cache arbiter 204 receive a clock signal bf_clk.

A lc_mp-addr[24] bit is used to control a selector or mux 244, which selects between the bf_clk and f_clk signals depending on whether the buffer memory or flash memory is being used. The lc_map-addr[24] bit is also used to control a selector or mux 246, which selectively outputs a lc_req signal from the line cache 230 to either a buffer manager line cache interface (BF_LC_IF) 250 or a flash memory line cache interface (F_LC_IF) 254 (through one or more intermediate circuits). The lc_map-addr[24] bit is also used to control a selector or mux 248, which selectively controls the input of acknowledgment signals that are generated by the interfaces 250 and 254 to the line cache 230. A synchronizer 260 synchronizes outputs of the BM_LC_IF 250 due to the use of different clocks. The line cache 230 also outputs the lc_addr [24:0] directly to the interfaces 250 and 254 as shown in FIG. 6.

Figure 7:
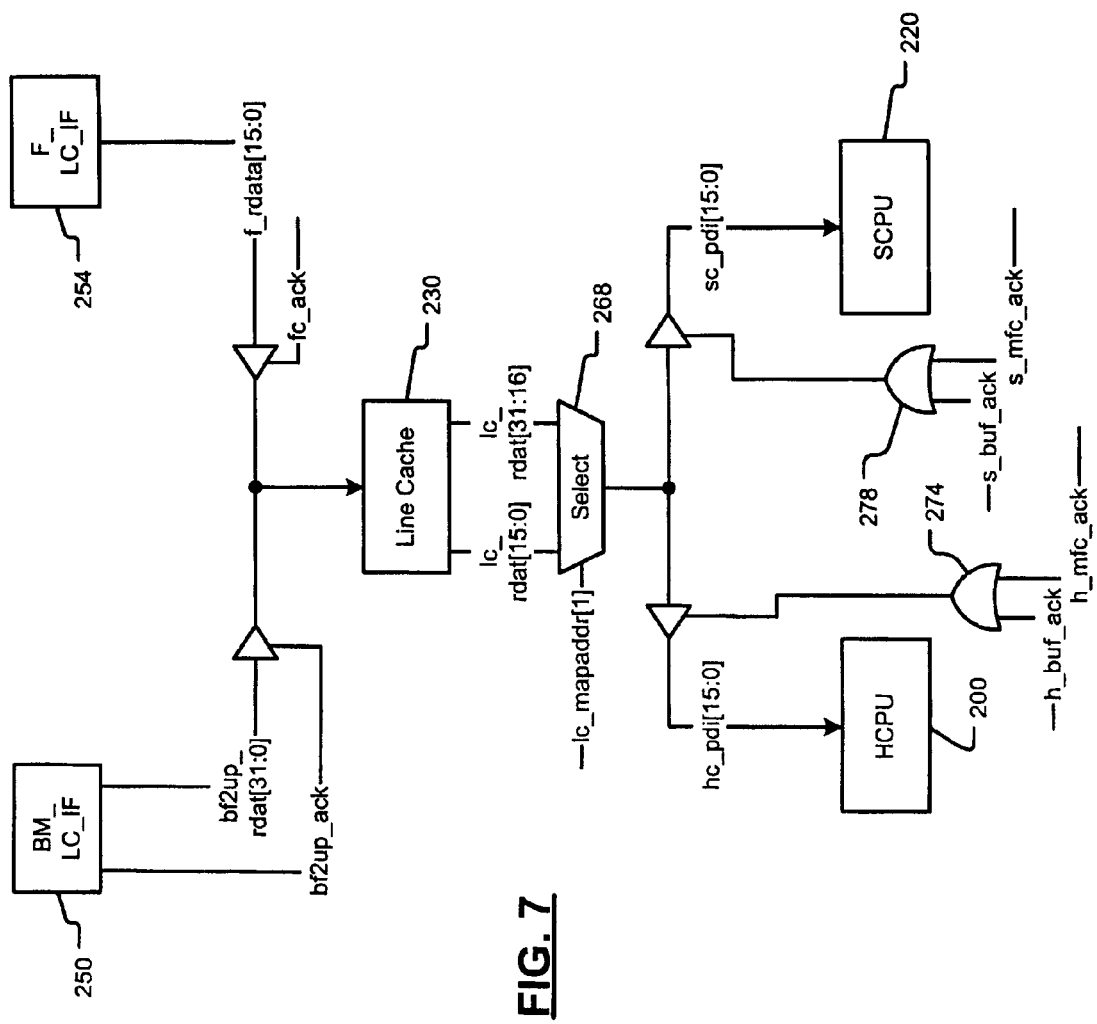
FIG. 7 is a line cache data path diagram for the line cache controller of FIG. 2.

Referring now to FIG. 7, a line cache data path diagram is shown. The BM_LC_IF 250 outputs a buffer data signal (bf2up_rdat[31:0]) to the line cache 230 when the buffer ack (bf_2up_ack) is present. The F_LC_IF interface 254 outputs f_rdata[15:0] when the flash ack (fc_ack) is present to the line cache 230.

The line cache 230 outputs lcrdat[15:0] and lc_rdat[31:16] to a selector or mux 268, which is controlled by lc_map_addr [1]. While the data is output in two 16 bit words due to the use of 16 bit processors, 32 bit and other types of processors can be used. The memory size can also be varied above and below 32 bits. An output of the selector 268 is input to the host and/or servo CPU as hc_pdi[15:0] and sc_pdi[15:0], respectively. Selection of the host and servo CPU is made by outputs of OR gates 274 and 278, which receive host buffer or flash ack (h_buf_ack and h_fc_ack) or servo buffer or flash ack (s_buf_ack and s_fc_ack) signals, respectively as inputs.

Figure 8:
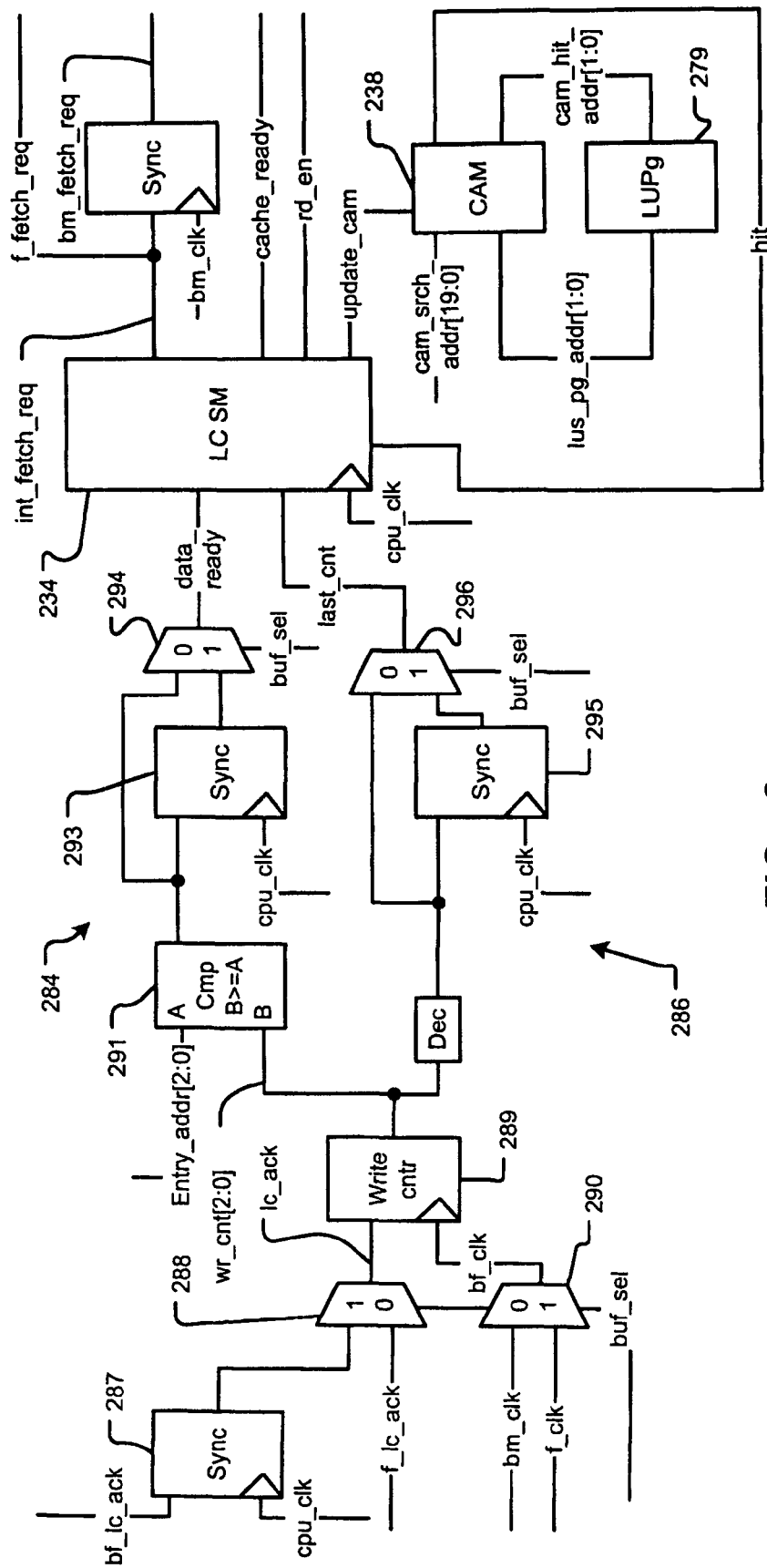
FIG. 8 is a functional block diagram of the line cache controller for FIGS. 1 and 2.

Referring now to FIG. 8, a block diagram of the line cache 230 is shown. The line cache 230 includes the line cache state machine 234, the CAM 238, a least used page generator 279 (which identifies the least used page), a data ready circuit 281 (which generates a data_ready signal) and a last count circuit 283 (which generates a last_cnt signal). The data_ready signal is set when the requested data from the buffer or flash is retrieved, stored in the cache and ready to be used by the requesting CPU.

The data ready circuit 284 includes a sync circuit 287, which receives bf_lc_ack signal and the cpu_clk signal. An output of the sync circuit 287 is input to a multiplexer 288, which also receives a flash line cache ack (f_lc_ack) signal and which outputs a line cache ack (lc_ack) signal to a write controller 289. The write controller 289 also receives a multiplexed clock signal (either bm_clk or f_clk) output of a multiplexer 290. The write counter 289 outputs a write count signal wr_cnt[2:0] to a comparator 291, which compares wr_cnt[2:0] to entry_addr[2:0]. If the wr_cnt[2:0] is greater than or equal to entry_addr[2:0], then the data is ready. A sync circuit 293 (which receives cpu_clk) and multiplexer 294 (with buf_sel as control) output a data_ready signal to the line cache state machine 234.

The wr_cnt[2:0] signal is also output to a sync circuit 295 (which receives cpu_clk) and a multiplexer 296 (with buf_sel as control), which generate the last_cnt signal. The CAM 238 and least used page circuit 279 are described further below in conjunction with FIGS. 9-11.

Figure 9:
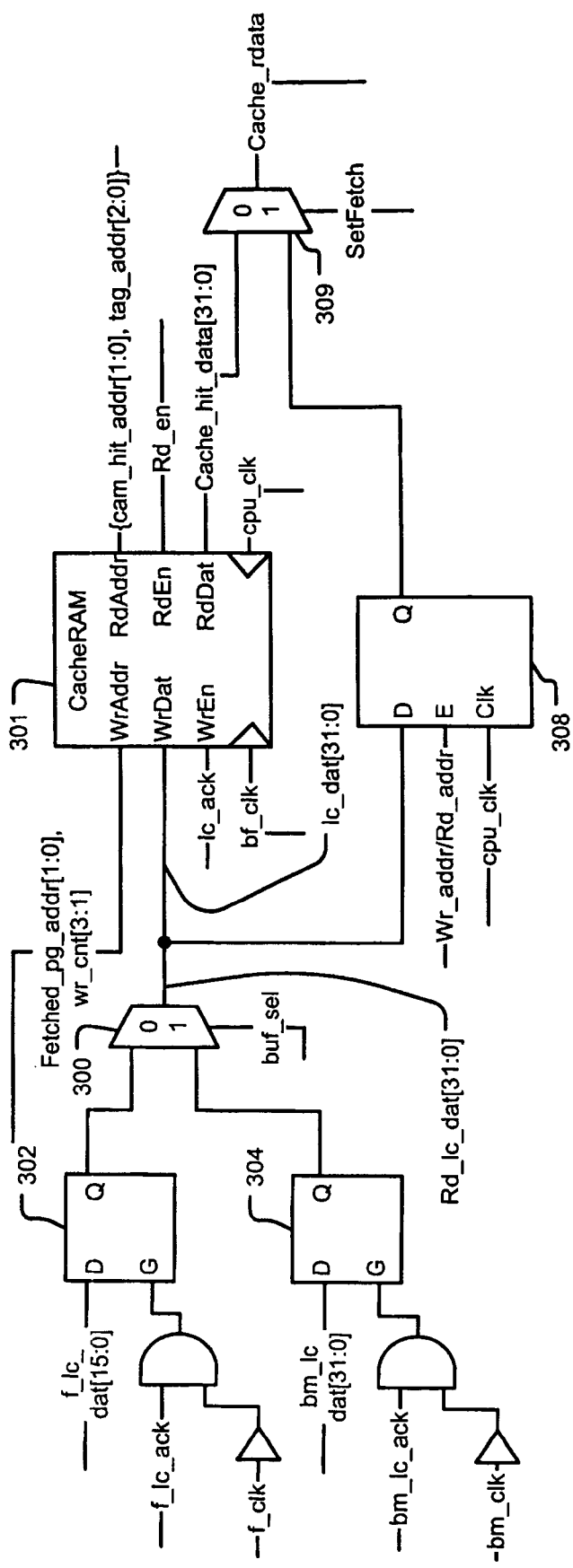
FIG. 9 is a functional block diagram of cache RAM.

Referring now to FIG. 9, a multiplexer 300 (with buf_sel) as the input selects between the buffer and flash memory data when writing data to cache memory 301. Latching flip flop 302 temporarily latches the data f_lc_dat[15:0] until both the f_lc_ack and f_clk signals are high. Latching flip flop 304 temporarily latches the data bm_lc_dat[31:0] until both the bm_lc_ack and bm_clk signals are high. When a hit occurs, the fetched_pg_addr is sent to the cache memory 301. Cache_hit_data[31:0] is returned to the requesting processor and cam_hit_addr[1:0] and tag_addr[2:0] are also returned. Data from the memory can also bypass the cache memory 301 via flip flop 308 and multiplexer 309.

Referring now to FIG. 10, mapping of addresses is shown. The MSB of the lc_map_addr_lat[24:5] are defined as cam_search_addr[19:0]. Bits [4:2] are the tag_addr[2:0]. A fetch_addr corresponds to {lc_map_addr_lat[23:5],0,0,0,0,0}. An entry_addr[2:0] corresponds to fetch_addr[4:2].

In FIG. 11, the generation of the addressing signals is shown. D-type flip flops 320 and 324 are shown, although other circuits may be used. A D input of the flip flop 320 receives lc_map_addr[24:0] and an E input receives lc_map_en. A Q output of the flip flop 320 (lc_map_addr_lat [24:0]) is input to a D input of the flip flop 324. An E input of the flip flop receives int_fetch_req. A Q output of the flip flop 324 outputs lc_req_addr[24:0], from which fetch_addr[23:0], entry_addr[2:0] and buf_sel {corresponding to lc_map_addr[24]} are generated.

Referring now to FIG. 12, cam_hit_addr hit and cpu_clk signals are output to a least used page select device 330 and a flip flop 334. The least used page select device 330 tracks usage of pages stored in cache. For example, the least used page select device 330 can include a counter for each page. The least used page select device 330 increments the counter associated with a page each time that the page is hit. When a miss occurs, the page with the lowest counter value is selected as the least used page. The fetched page is stored at the address of the recently identified least used page and the associated counter is reset.

Figure 13:
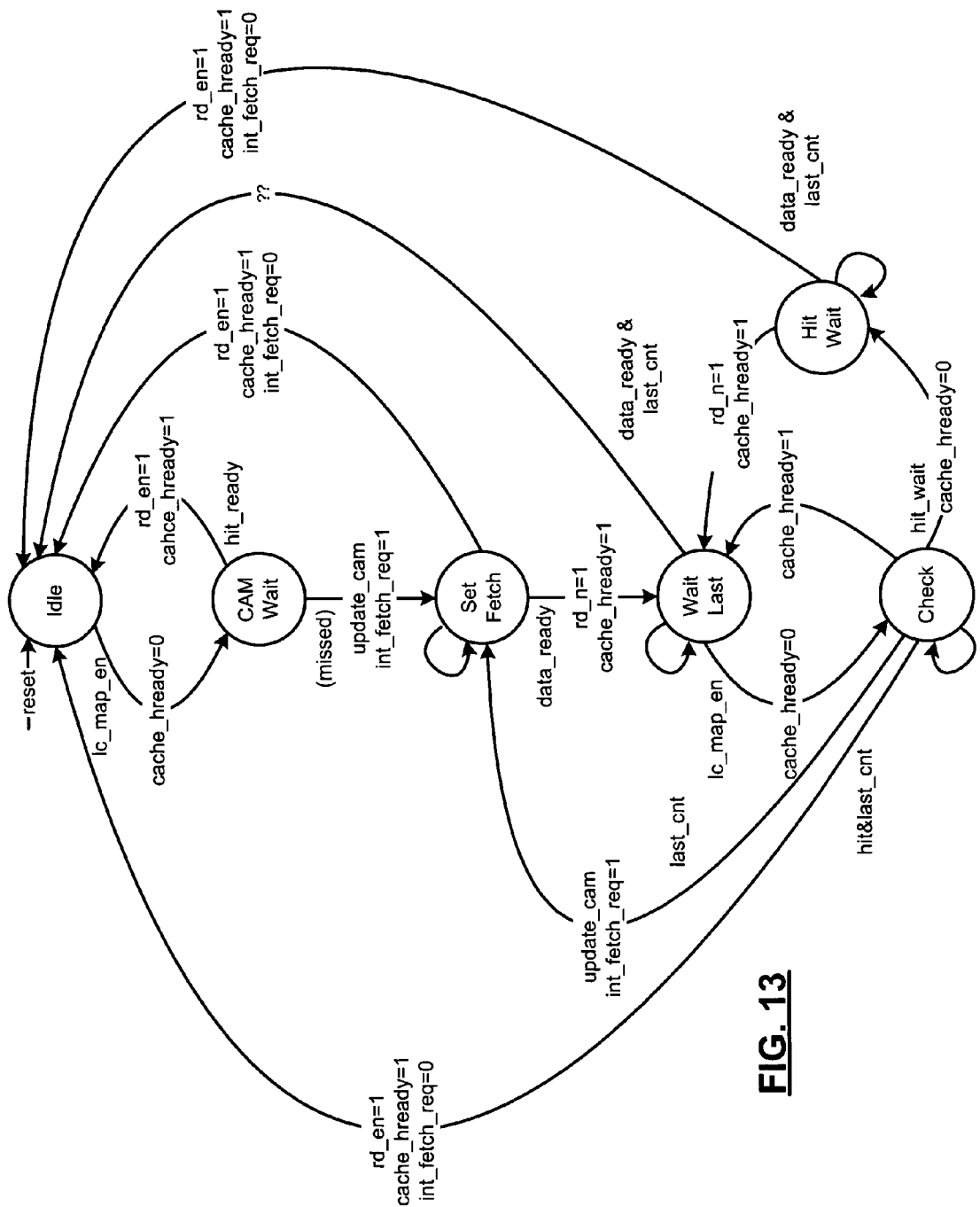
FIG. 13 is a state diagram for the line cache state machine of FIG. 8.

Referring now to FIG. 13, on reset the line cache state machine 234 transitions to an Idle state. When lc_map_en is set, the line cache state machine 234 transitions from the Idle state to a CAM Wait state and sets cache_hready=0. When hit_ready is set, the line cache state machine 234 transitions from the CAM Wait state back to the Idle state and sets rd_en=1 and cache-hready=1.

When the data miss occurs, the line cache state machine 234 transitions from the CAM Wait state to a Set Fetch state and performs update_cam and sets int_fetch=1. Update_cam includes the following actions/steps: stores part of requested address into the CAM entry that is indexed by a value retrieved from the least frequently used page logic. When data_ready is set, the line cache state machine 234 transitions from the Set Fetch state to a Wait Last state and sets rd_n=1 and cache_hready=1. When lat_cnt and lc_map_en are set, the line cache state machine 234 transitions from the Set Fetch state back to the Idle state and sets rd_en=1, cache_hready=1 and int_fetch_req=0.

When lc_map_en is set, the line cache state machine 234 transitions from the Wait Last state to a Check state and sets cache_hready=0. When hit_ready is set, the line cache state machine 234 returns from the Check state to the Wait Last state and sets cache_hready=1. When hit_wait is set, the line cache state machine 234 transitions from the Check state to a Hit Wait state. When hit_ready is set, the line cache state machine 234 transitions from the Hit Wait state back to the Wait Last state and sets rd_n=1 and cache_hready=1.

When a miss occurs, the line cache state machine 234 transitions from the Check state to the Set Fetch state and performs update_cam and int_fetch_req=1. When hit and last_cnt are set, the line cache state machine 234 transitions from the Check state to the Idle state and sets rd_en=1, cache_hready=1 and int_fetch_req=0. When data_ready and last_cnt are set, the line cache state machine 234 transitions from the Hit Wait state to the Idle state and sets rd_en=1, cache_hready=1 and int_fetch_req=0. When last_cnt and lc_map_en are set, the line cache state machine 234 transitions from the Wait Last state to the Idle state. The hit_ready state is set when [hit & (cam_hit_addr=fetched_pg_addr) & dataready | hit & (cam_hit_addr!=fetched_pg_addr)]. The hit_wait state is set when [hit & (cam_hit_addr=fetched_pa_addr) & data_ready)].

More generally, the lc_map_en signal is set when the line cache is requested for data access. The hit_ready signal is set when the requested data is in the cache and available. The data_ready signal is set when a miss occurs, data from the buffer or flash is retrieved and the requested data is available (even though the burst may not be complete). The last_cnt signal is set when the last byte of a burst is available for the cache. The hit_wait state is set after a miss, data arrives for the first request and a subsequent request is made from the same page but is not yet available. The hit signal is set when the requested data is in the cache and available.

As described above, the line cache state machine is modified based on inputs from one or more circuits, for example from the least used page device, which identifies the least used page and replaces the least used page. As can be appreciated, other inputs may be used in addition and/or instead of these inputs. For example, the operation and/or transitions of the line cache state machine can be modified based upon internal states of one or more of the CPUs connected thereto. For example, the least used page algorithm may be used to identify a least used page and a second least used page when a miss occurs. The least used page is flushed unless internal states of a CPUs will probably need in the near future as determined by the internal state of the CPU. If the least used page will probably be used by the CPU soon, the second least used page can be replaced instead of the least used page. The least used page algorithm also may provide a list that ranks the pages from least to most used pages to provide additional replacement flexibility when the internal states of the CPU(s) are being monitored. Therefore, more than one least used page may be saved if it is likely that the CPU will need the page in the near future.

Figure 14:
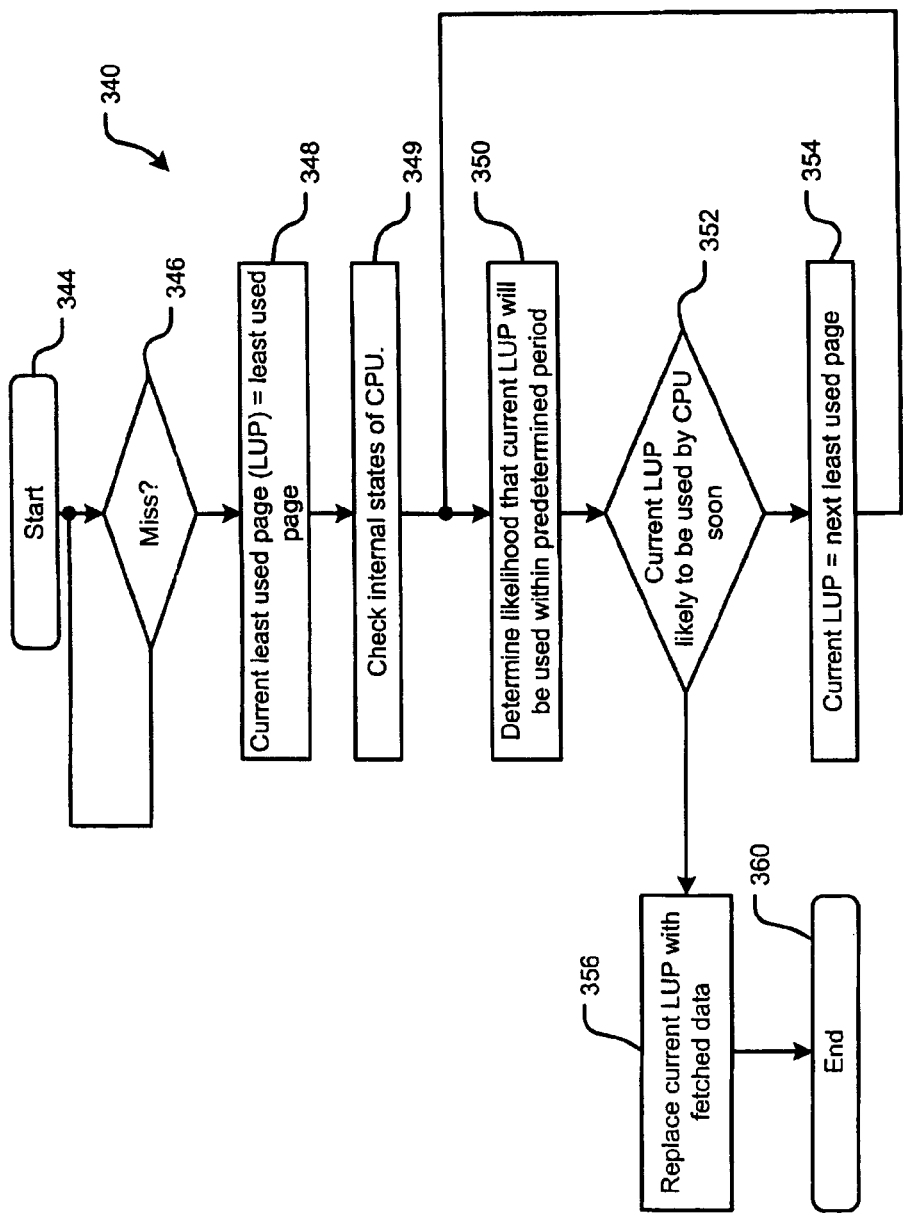
FIG. 14 illustrates modifications of the line cache state machine of FIG. 13 using internal states of the CPU.

Referring now to FIG. 14, one exemplary implementation that modifies the line cache state machine based upon internal states of the CPU(s) is shown generally at 340. Control begins in step 344. In step 346, control determines whether a miss occurs. If not, control loops back to step 346. If true, control sets a current least used page to a least used page (LUP) identified by the least used page device. In step 349, control checks internal states of the CPU. In step 350, control determines a likelihood that the current LUP will be used by the CPU within a predetermined period. If the current LUP is not likely to be used within the predetermined period as determined in step 352, the current LUP is set equal to the next LUP in step 354. Control loops from step 354 to step 350. If the current LUP is likely to be used within the predetermined period as determined in step 352, the current LUP is replaced by the fetched data in step 356 and control ends in step 360.

Figure 15:
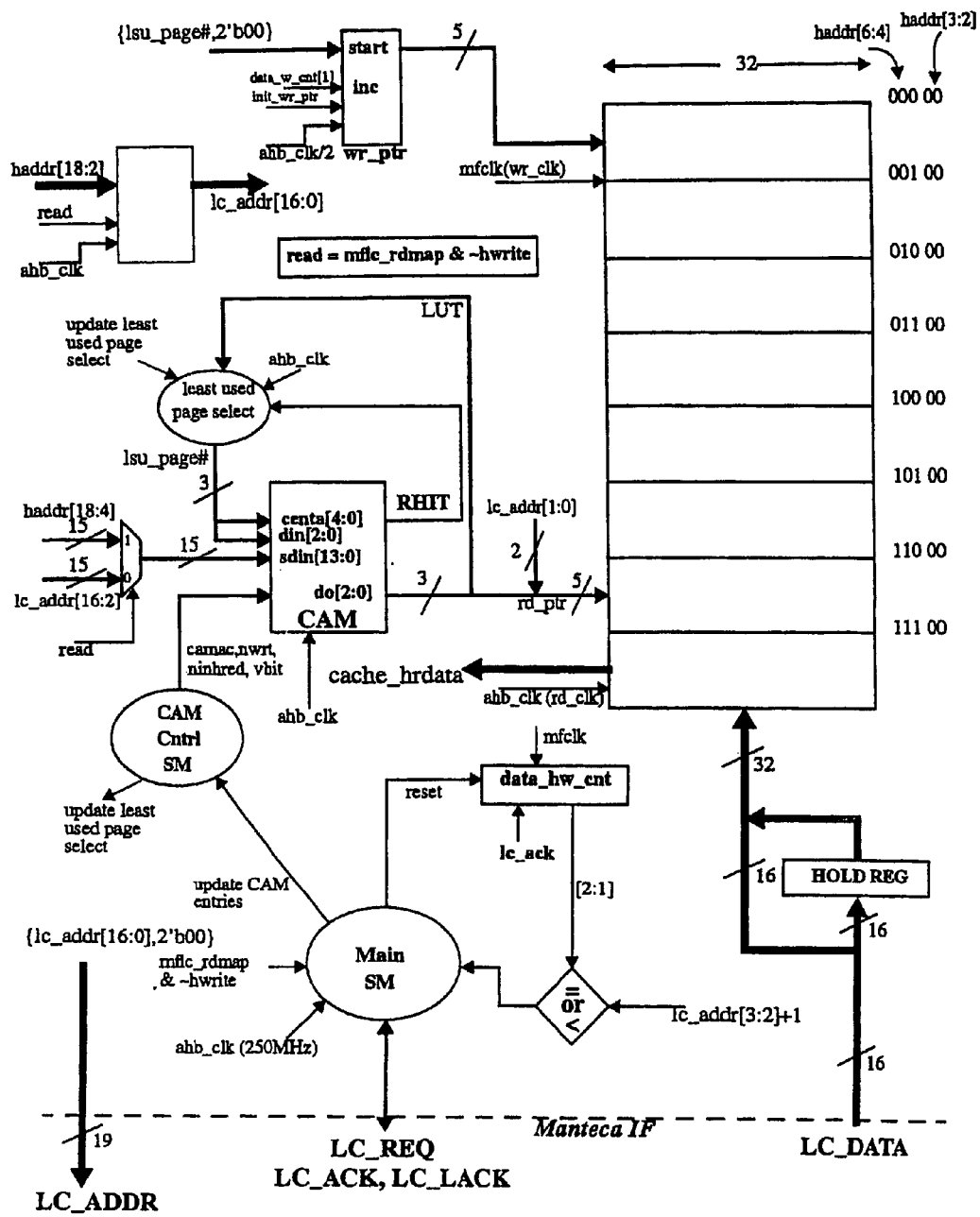
FIG. 15 is a functional block diagram of a line cache controller for a single memory device such as flash memory.

FIG. 15 is a functional block diagram of a line cache controller for a single memory device such as flash memory.

Figure 16:
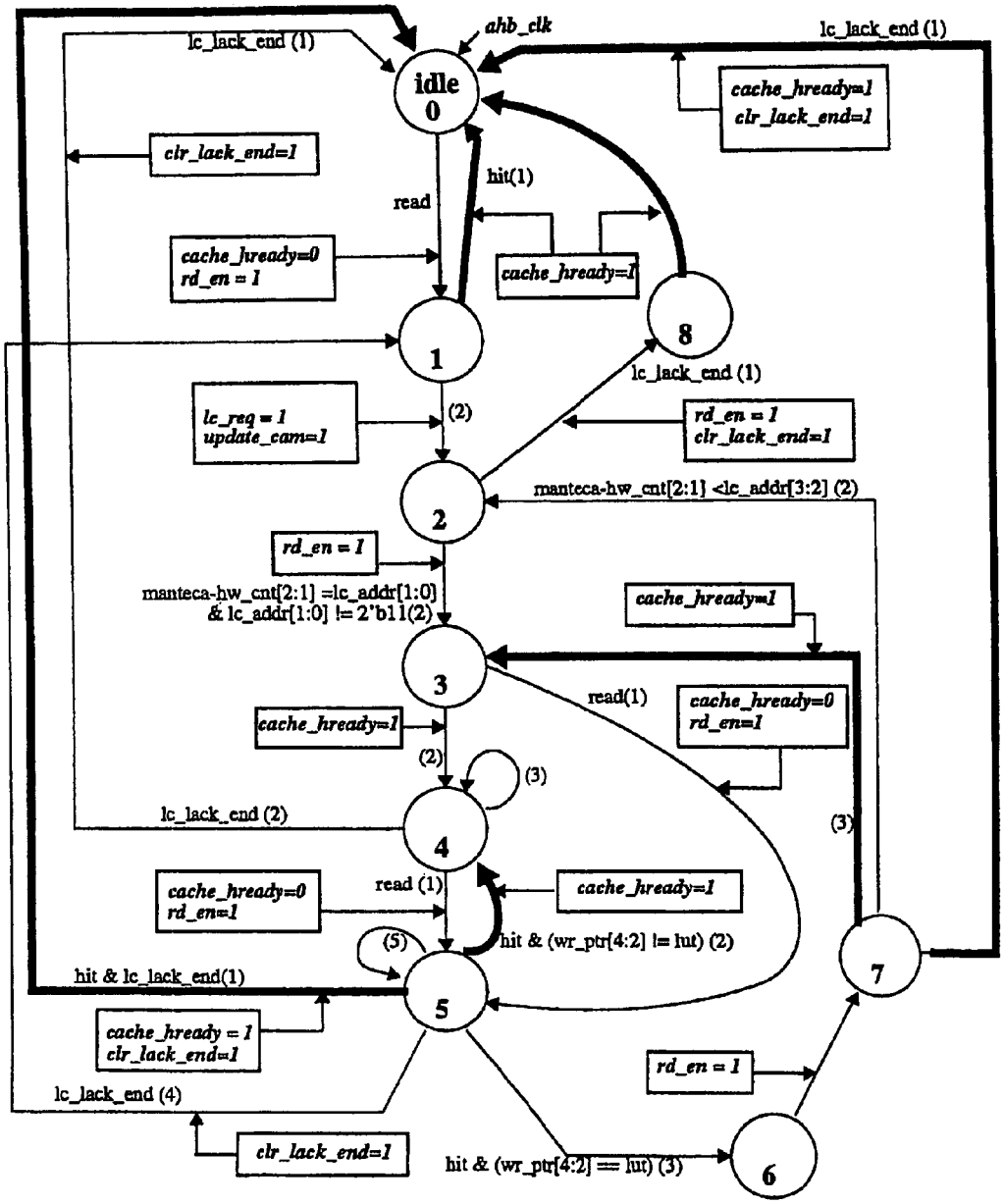
FIG. 16 illustrates a line cache state machine for the line cache controller of FIG. 15.

FIG. 16 illustrates a line cache state machine for the line cache controller of FIG. 15. S0 is an Idle state that is entered after a reset or after a normal return of an operation. S1 is a ReadAck1 (Read Acknowledge 1) state that is entered from Idle state when CPU requests a read via a read (read) signal. During this state, the FSM performs a read ahead from line cache (rd_en=1) and deasserts hready (cache_hready=0). TS01=read. (transition from state S0 to state S1=read).

In S1, if a hit is detected via the cam look up hardware, the FSM goes back to idle state. hready is asserted (cache_hready=1). The valid read ahead hit data during TS01 is returned to the CPU. Otherwise, the FSM goes to S2 (Line cache request state). During the TS12, the cache is requested to perform a read and the CAM hardware is updated with the selected least used page pointer. (lc_req=1, update_cam=1) S2 is a LREQ (Line Cache Request State). In S2, when the FSM detects a lc_lack_end (a level detection of the lc_lack signal), which indicates the last data from the Flash had arrived, it will go to S8 (Wait End 2 State). During this transition (TS28), the FSM will clear the level detection logic of the lc_lack and perform a data read from the cache (rd_en=1, clr_lack_end=1). In S2, if the above the condition (TS28) is not true, and the FSM detects a requested data has arrived from the FSM Flash (f_hw_cnt[2:1]=lc_addr[1:0]), it will go to S3 (Data Arrived State). During this transition, the FSM will perform a read from the cache. (rd_en=1). Otherwise, the FSM stays in S2.

S3 is a Data Arrive State. In S3, when the FSM detects a CPU requests a read (following the sequence . . . S3-S4-S5-S6-S7-S3 which will be explained later), it will go to S5 (Data Wait 1 State). During TS35, it will do a read ahed from the cache and deassert the hready(rd_en=1 and cache_hready=0). Otherwise, the FSM will go to S4 (Wait End 1 State) following the sequence S1-S2-S3-S4. During this TS34, the hready signal is asserted (cache_hready=1). The requested data is returned to CPU. S4 is a Wait End 1 State. In S4, when the FSM detects a CPU read request (following the returning of the requested data of the previous read in TS34), the FSM will go to S5 (read Acknowledge 3 state). Read ahead from the cache is performed and hready is deasserted (cache_hready=0 and rd_en=1). If TS45 is not true and the FSM detects a lc_lack_end, which indicates the end of the data fetching from the Flash, it will go back to the Idle State. Otherwise it will stay in S4. S5 is a Read Acknowledge 2 State. In S5, when the FSM detects a lc_lack_end and a hit from the CAM logic, it will go back to idle state, clear the level last ack detection logic and assert the hready (cache_hready=1 and clr_lack_end=1). This is the condition when the fetching of the full page of the first data request is finished and the following second data request is a hit of the same fetching page. In S5, if TS50 is not true and the FSM detects a hit on a different page than the current fetching page (wr_ptr[4:2]!=lut), the FSM will go to S4 and it asserts hready (cache)hready=1). It will return the requested hit data from the different hit page. In S5, if TS50 & TS54 conditions are not true and the FSM detects a hit in the same page (wr_ptr[4:2]==lut), it will go to S6 (Wait Data 1 State). In S5, if TS50 & TS56 are not true and the FSM detects a lc_lack_end, it will go back to the Idle State. This indicates the end of the fetching of a full requested page. clr_lack_end is used to clear the level last ack detection logic. In S5, if TS50 & TS54 & TS56 are not true, the FSM will stay in S5.

S6 is a Wait Data 1 State. In S6, FSM will go to S7 (Wait Data 2 State) and perform a read ahead (rd_en=1). This state is entered when the following data request is a hit of the current fetching page.

S7 is a Wait Data 2 State. In S7, when the FSM detects a last ack, it goes back to the idle state and returns the 2nd requested hit data in the current fetching page. (cahce_hready=1 and clr_lack_end=1). In S7, if TS70 is not true and the requested data has not arrived yet (manteca_hw_cnt[2:1]<lc_addr[3:2]), the FSM will go to S2 (Line Cache Request State). It will stay in this state to wait for the data to arrive. In S7, if TS70 and TS72 are not true, the FSM will go to S3 and assert hready. This indicates that the second hit requested data has arrived but the last fetching data has not arrived yet. The FSM go to this to wait for the last fetching data to arrive via the last ack signal. S8 is a Wait End 2 State. When in this state, the FSM will go back to idle and returned the hit data which in this case is the last fetching data. The FSM asserts the hready signal (cache_hready=1).

The following are line cache state machine flows for the state machine in FIG. 16: Example 1 assumes that there is a miss, data return 1, data 2 request and data 2 is on the same page but not available. The state flow is as follows:

S0 S1 S2 S3 S4 S5 S6 S7 S2 S3 S4 S0
S0 S1 S2 S3 S4 S5 S6 S7 S3 S4 S0
S0 S1 S2 S3 S4 S5 S6 S7 S2 S8 S0
S0 S1 S2 S3 S4 S5 S6 S7 S0
S0 S1 S2 S3 S4 S5 S0
S0 S1 S2 S3 S4 S0 S1 S0

Example 2 assumes data miss, data 1 return, data 2 request, and data 2 is hit while current page is fetching:

S0 S1 S2 S3 S4 S5 S1 S2 S3 S4 S5 S4 S0
S0 S1 S2 S3 S4 S5 S1 S2 S3 S4 S5 S0
S0 S1 S2 S3 S4 S5 S1 S2 S3 S4 S0 S1 S0

Example 3 assumes a miss followed by another miss:

S0 S1 S2 S3 S4 S5 S1 S2 S3 S4 S5 S0
S0 S1 S2 S3 S4 S0 S1 S2 S3 S4 S0

FIGS. 17A-17D illustrate hit and miss examples for the state machine of FIG. 16. In FIG. 17A, data is a miss. 8 burst of 16 is fetched from the flash to the selected page (based on the least used page select algorithm). The fetching starts at time t0. Data is sent to the CPU at time t1. The fetching is finished at time t2.

In FIG. 17B, the second data is hit in the same page, which was just fully fetched. The fetching starts at time t0. Data1 is send at time t1 and the page is fully fetched at time t2. Data 2 is requested by the CPU at time t3 and is sent at time t4 (where t0<t1<t2<t3<t4<t5).

In FIG. 17C, the second data is hit in the same page, which is currently fetched but not completely fetched. Data1 is sent at time t1. Data2 is requested at time t2. Data2 is sent at time t3. The page is fully fetched at time t4 (where t0<t1<t2<t3<t4<t5).

In FIG. 17D, data is a hit on a different page when the current page is fetching. Data1 is requested and page 0 starts to be fetched at time t0. At time t1, data1 is sent to the CPU. Data2 is a miss that is requested by CPU at time t2. The page 0 is fully fetched at time t3. Page 1 starts to be fetched at time t4. Data2 is sent to the CPU at time t5. Data 3, which is a hit on page 0, is requested. Data 2 is sent to the CPU at time t6. Page 1 is fully fetched at time t7.

Figure 18:
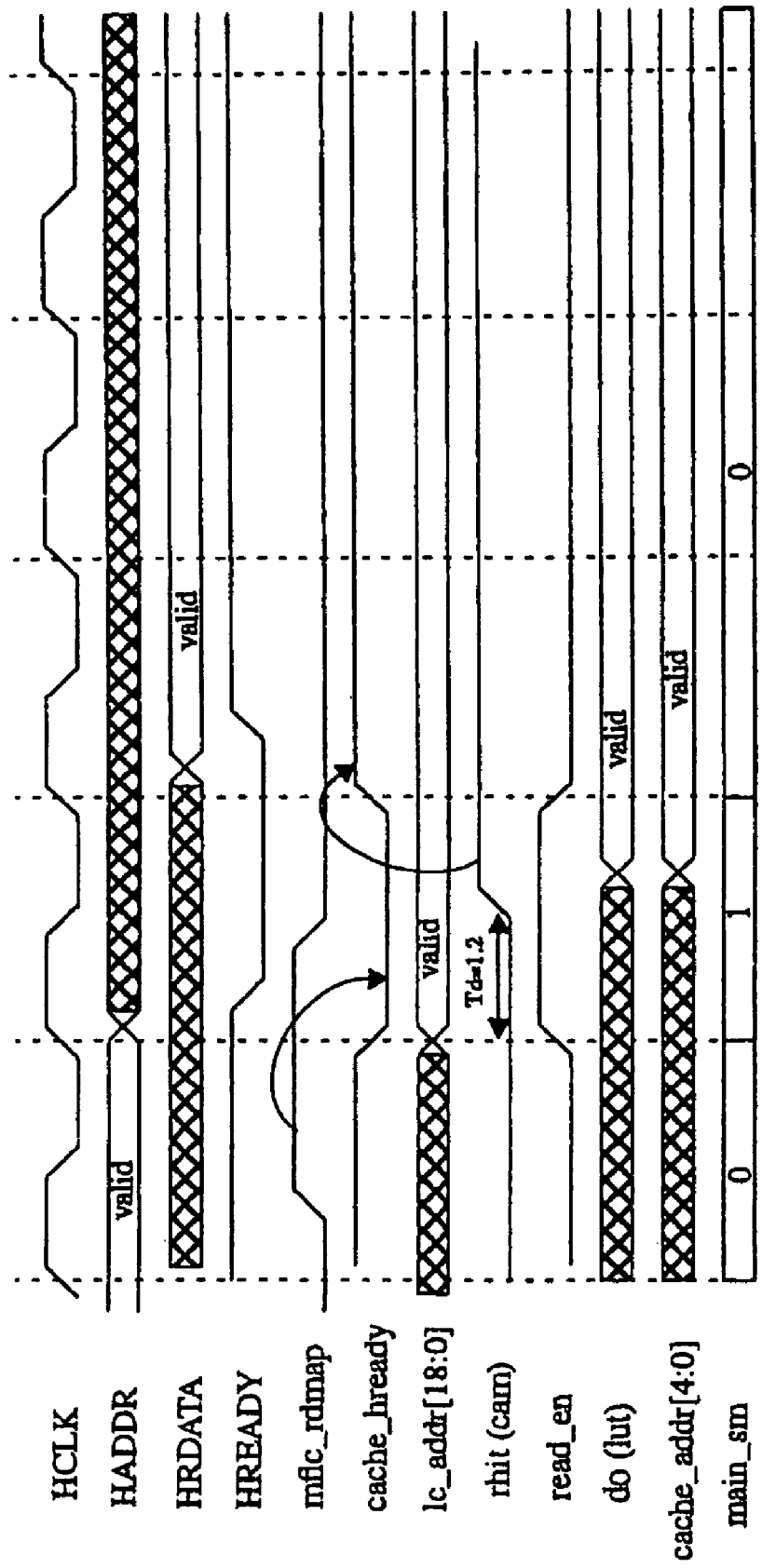
FIG. 18 are waveform diagrams illustrating timing during a hit for the state machine of FIG. 16.
Figure 19:
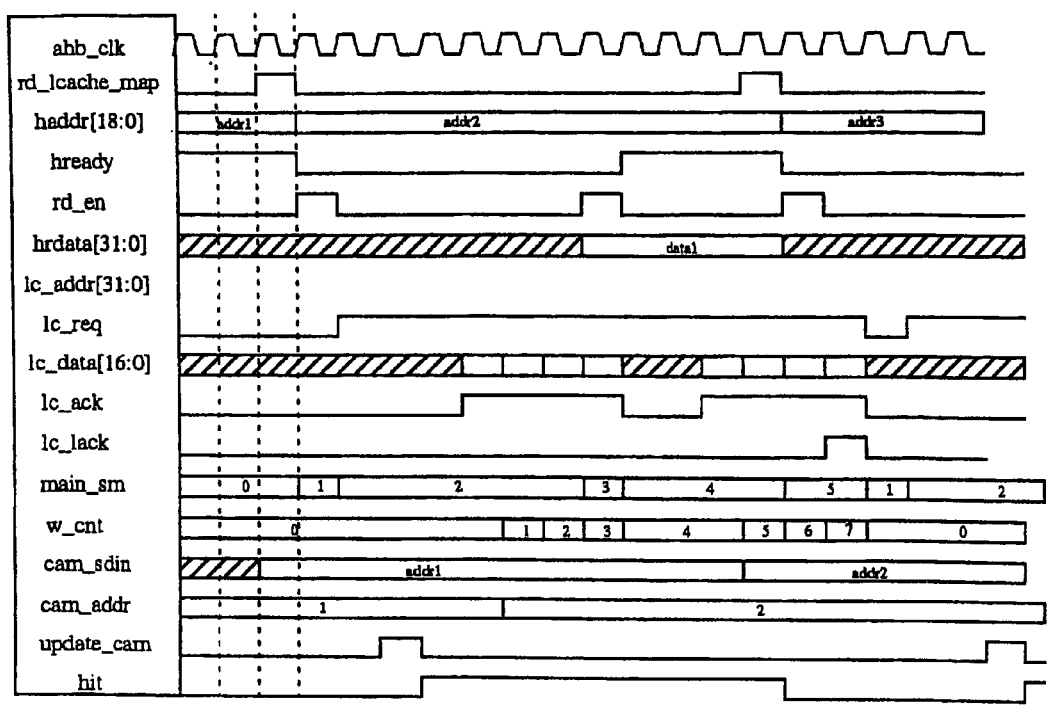
FIG. 19 are waveform diagrams illustrating timing during a miss after miss for the state machine of FIG. 16.
Figure 20:
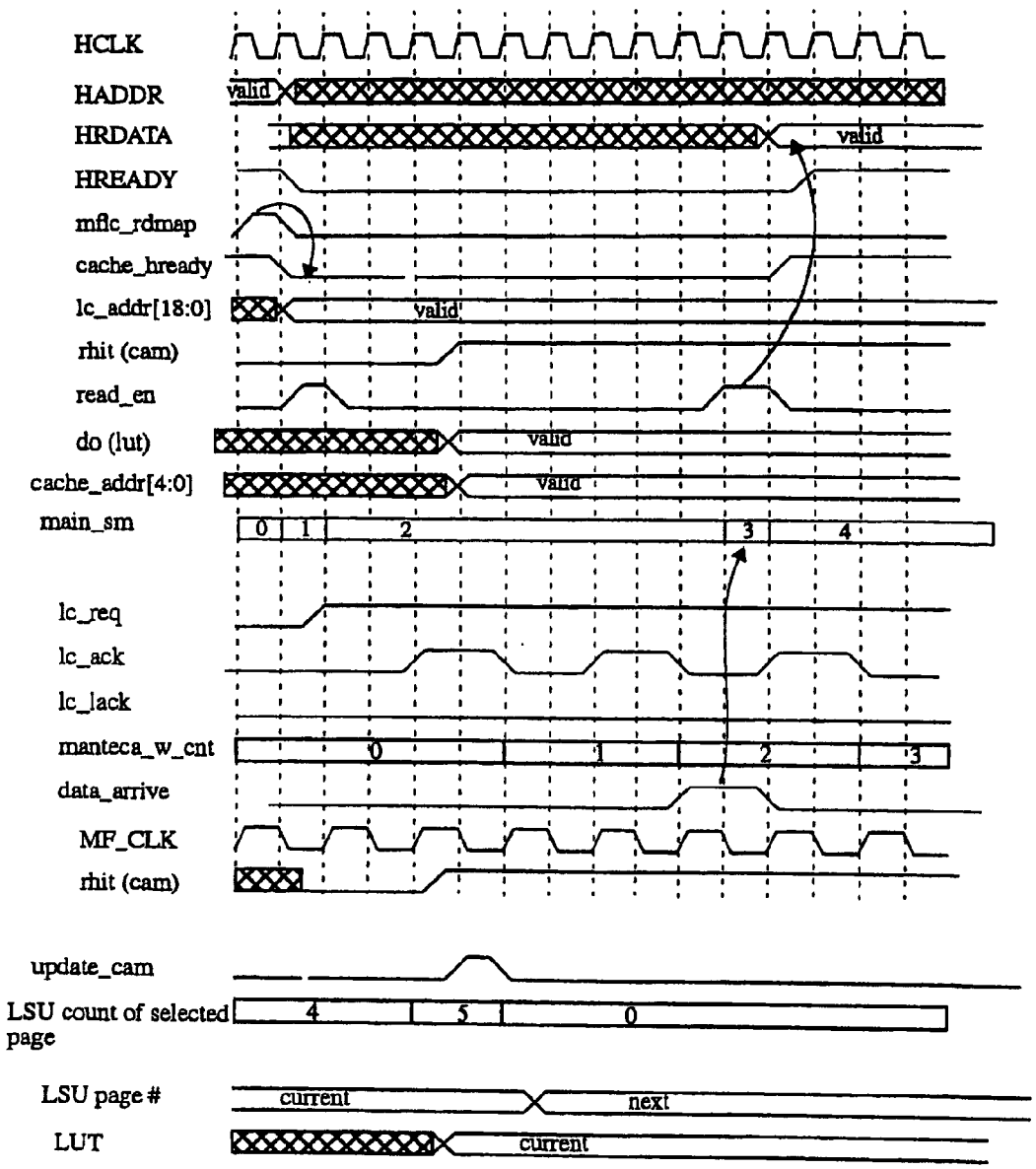
FIG. 20 are waveform diagrams illustrating timing during a miss for the state machine of FIG. 16.
Figure 21:
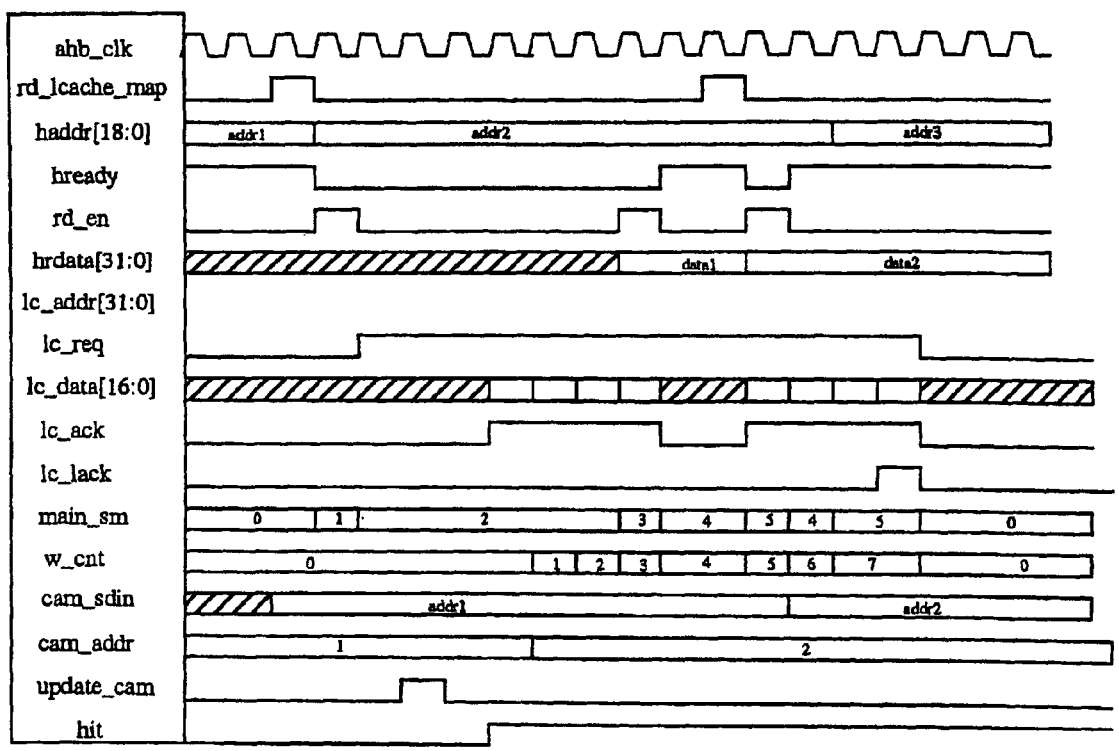
FIG. 21 are waveform diagrams illustrating timing during a hit when the fetching of a first miss is in progress for the state machine of FIG. 16.

FIG. 18 are waveform diagrams illustrating timing during a hit for the state machine of FIG. 16. FIG. 19 are waveform diagrams illustrating timing during a miss after miss for the state machine of FIG. 16. FIG. 20 are waveform diagrams illustrating timing during a miss for the state machine of FIG. 16. FIG. 21 are waveform diagrams illustrating timing during a hit when the fetching of a first miss is in progress for the state machine of FIG. 16.

Figure 22:
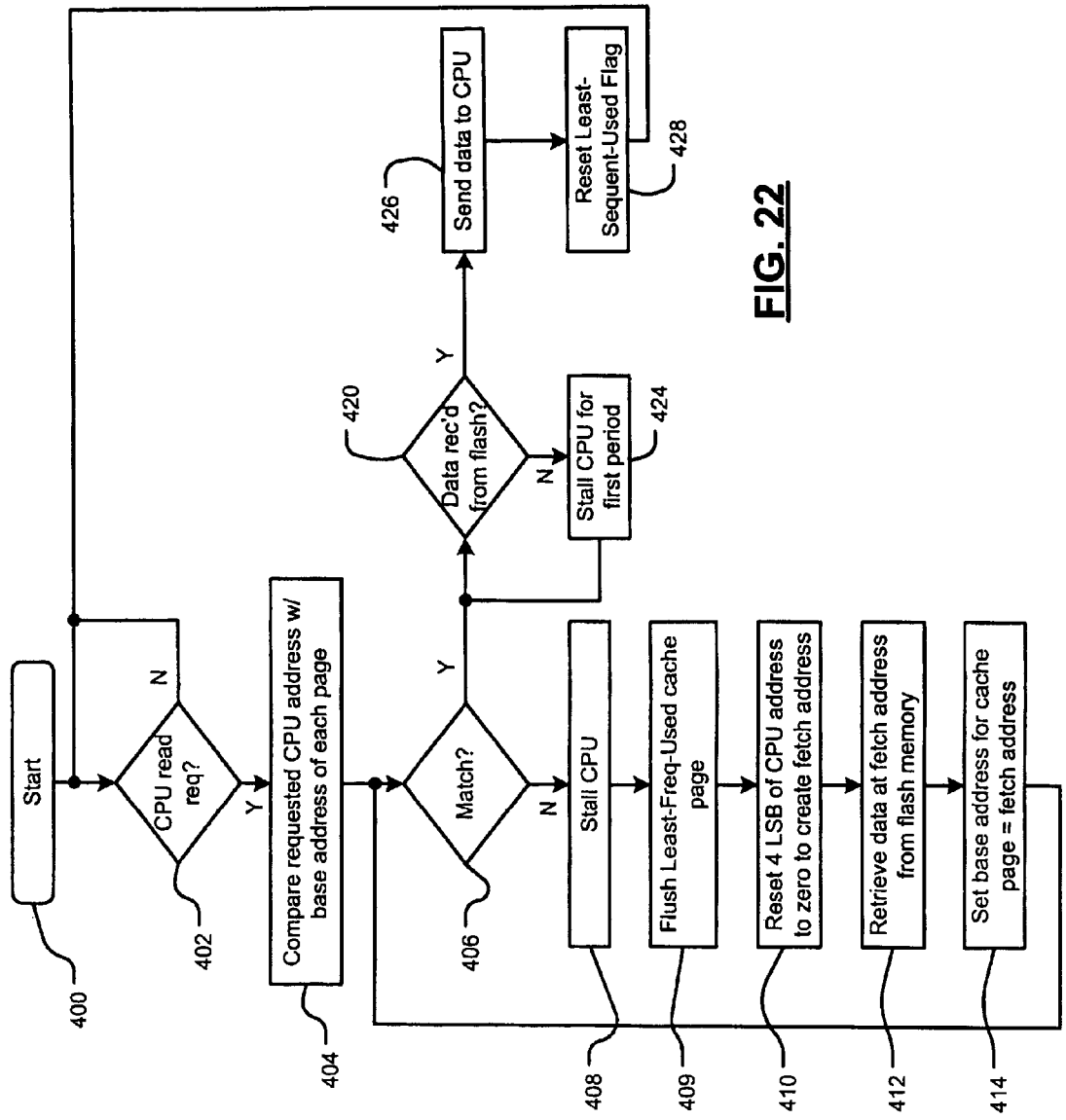
FIG. 22 illustrates steps of a simplified functional block diagram for hit and misses.

FIG. 22 illustrates steps of a simplified functional block diagram for hit and misses. Control begins in step 400. In step 402, control determines whether there is a CPU read request. If not, control returns to step 402. Otherwise, control continues with step 404 and compares the requested CPU address with the base address of each page. An address translation step may precede step 404. In step 406, control determines whether there is a hit or match. If not, the CPU is stalled in step 408. In step 409, the least used page is flushed from the cache. In step 410, the 4 LSB of the CPU address are reset before fetching the data. In step 412, the data at the fetch address is retrieved and stored in the open cache page. In step 414, the base address for the cache page is set equal to the fetch address.

If there is a match in step 406, control determines whether the data is received from the flash. If not, the CPU is stalled for a predetermined period in step 424 and control returns to step 420. If the data is received in step 420, control sends the data to the CPU in step 426 and the Least Sequential Used Flag for the page is set equal to 0.

FIG. 23 illustrate address mapping and pointer descriptions for the line cache controller of FIG. 15.

Figures 24, 25:
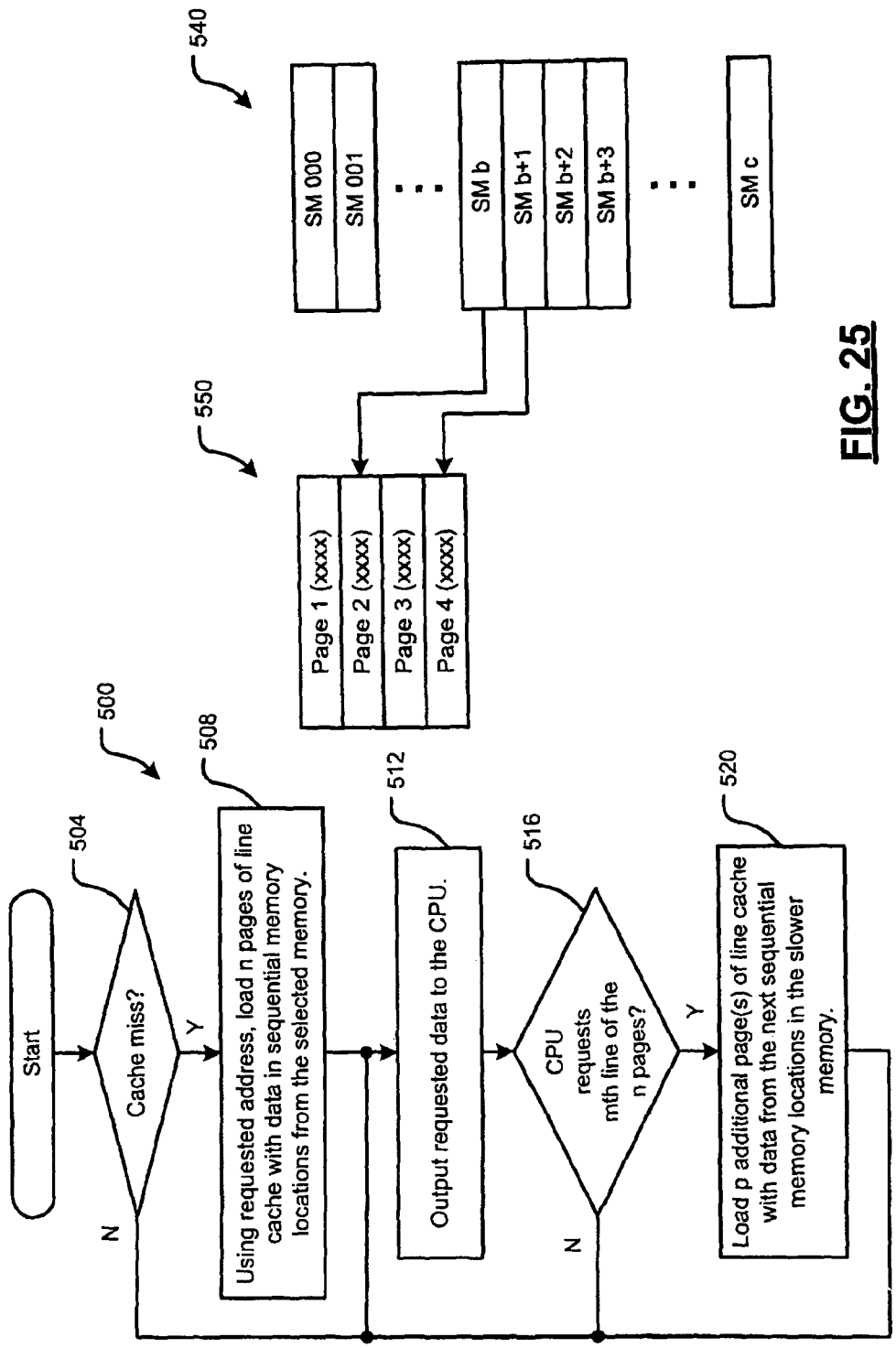

Referring now to FIG. 24, a look ahead method that is executed by the line cache according to the present invention is shown generally at 500. Using the look ahead method improves the performance of the line cache when one of the CPUs requests data that is located in sequential memory locations in one of the slower memory devices. When a miss occurs as determined at step 504, instead of loading a single page of the line cache, n pages of the line cache are loaded with data located in sequential memory locations in the selected slower memory in step 508. In this case, n is less than or equal to the number of pages of line cache.

The retrieved data is output to the CPU in step 512. When the CPU requests data from the $m^{th}$ line (where $1<m\leq n$) as determined in step 516, p additional pages of the line cache are loaded with data that is located in the next sequential memory locations in the slower memory. The data can begin being loaded at the start of the $m^{th}$ line, at the end of the $(m-1)^{th}$ line, or at other suitable times.

The selected values for n, m and p will depend upon the system requirements, the number of pages in the line cache and the access times of the slower memory devices. The look ahead method 500 according to the present invention ensures that as long as the CPU continues to access sequential memory locations, there will never be a miss after the initial miss. This improves the performance of the line cache when one of the CPUs sequentially accesses the memory.

Referring now to FIGS. 25-27, an exemplary implementation is shown for the case where the line cache includes 4 pages, n=2, m=2, and p=1, although skilled artisans will appreciate that other page numbers and values for n, m, and p may be used without departing from the invention. In FIG. 25, a miss occurs and first and second pages are loaded from slower memory device 540 (data at slower memory (SM) sequential locations b and b+1) into line cache 550. Depending upon the relative sizes of the pages and the memory locations in the slower memory, one or more memory locations may correspond to SM b. The line cache 550 preferably replaces the least used pages, which in this example are located initially at page 2 and then page 4. The notation "(xxxx)" is used in FIGS. 25-27 to represent don't care values that are located in the pages of line cache before replacement.

Referring now to FIG. 26, Page 2 now contains data from SM b and Page 4 now contains data from SM b+1. The CPU requests data that is located in Page 2 of the line cache 550. When the CPU begins requesting data located in Page 4 of the line cache 550, the line cache 550 loads data from the next sequential location SM b+2 into a page corresponding to the current least used page, which is Page 1 in this example.

Referring now to FIG. 27, Page 1 now contains data from SM b+2, Page 2 now contains data from SM b, and Page 4 now contains data from SM b+1. When the CPU begins reading data located in Page 1 of the line cache 550, the line cache 550 loads data from the next sequential location SM b+3 into a page corresponding to the current least used page, which is Page 3 in this example. This method continues until a miss occurs and the method is repeated. As can be appreciated, a miss will not occur after the initial miss as long as the CPU requests sequential data. While the foregoing example employs the least used page method for replacing pages in the line cache, other methods can be used to select the page that will be replaced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A memory storage system that is accessed by a first central processing unit (CPU), comprising:
    a line cache including a plurality of pages that are accessed by the first CPU;
    a first memory device that stores data that is loaded into said line cache when a miss occurs,
    wherein when said miss occurs and before a second miss occurs, n pages of said line cache are loaded with data from sequential locations in said first memory device, wherein n is greater than one;
    a second memory device; and
    a line cache control system that controls data flow between said line cache, the first CPU, said first memory device and said second memory device, and that includes:
        a first line cache interface that is associated with the first CPU, that receives a first program read request from the first CPU and that generates a first address from said first program read request;
        a first memory interface that communicates with said first memory device;
        a second memory interface that communicates with said second memory device; and
        a switch that selectively connects said line cache to one of said first and second memory interfaces, wherein when said line cache receives said first address, said line cache control system compares said first address to stored addresses in said line cache, returns data associated with said first address if a match occurs, and loads said n pages of said line cache when said miss occurs.

2. The memory storage system of claim 1 wherein when the first CPU requests data from an $m^{th}$ page of said n pages in said line cache, wherein m is greater than one and less than or equal to n, said line cache loads p additional pages with data from sequential locations in said first memory device.

3. The memory storage system of claim 1 further comprising:
    a second CPU;
    a second line cache interface that is associated with said second CPU, that receives a second program read request from said second CPU and that generates a second address from said second program read request; and a line cache arbitration device that communicates with said first and second line cache interfaces and said line cache and that resolves line cache access conflicts between the first CPU and said second CPU.

4. A memory storage system that is accessed by a first central processing unit (CPU), comprising:
a line cache including a plurality of pages that are accessed by the first CPU;
a first memory device that stores data that is loaded into said line cache when a miss occurs,
wherein after an initial miss, said line cache prevents any additional misses as long as the first CPU addresses sequential memory locations of said first memory device;
a second memory device; and
a line cache control system that controls data flow between said line cache, the first CPU, said first memory device and said second memory device, and that includes:
a first line cache interface that is associated with the first CPU, that receives a first program read request from the first CPU and that generates a first address from said first program read request;
a first memory interface that communicates with said first memory device;
a second memory interface that communicates with said second memory device; and
a switch that selectively connects said line cache to one of said first and second memory interfaces, wherein when said line cache receives said first address, said line cache control system compares said first address to stored addresses in said line cache, returns data associated with said first address if a match occurs, and loads said n pages of said line cache when said miss occurs.

5. The memory storage system of claim 4 wherein when said miss occurs, n pages of said line cache are loaded with data from sequential locations in said first memory device, wherein n is greater than one.

6. The memory storage system of claim 5 wherein when the first CPU requests data from an $m^{th}$ page of said n pages in said line cache, wherein m is greater than one and less than or equal to n, said line cache loads p additional pages with data from sequential locations in said first memory device.

7. The memory storage system of claim 4 further comprising:
a second CPU;
a second line cache interface that is associated with said second CPU, that receives a second program read request from said second CPU and that generates a second address from said second program read request; and
a line cache arbitration device that communicates with said first and second line cache interfaces and said line cache and that resolves line cache access conflicts between the first CPU and said second CPU.

8. A memory storage system, comprising:
a line cache including a plurality of pages;
a first central processing unit (CPU) that accesses data stored in said line cache;
a first memory device that stores data that is loaded into said line cache when a miss occurs,
wherein when said miss occurs and before a second miss occurs, n pages of said line cache are loaded with data from sequential locations in said first memory device, wherein n is greater than one, and wherein when said first CPU requests data from an $m^{th}$ page of said n pages in said line cache, wherein m is greater than one and less than or equal to n, said line cache loads p additional pages with data from sequential locations in said first memory device;
a second memory device; and
a line cache control system that controls data flow between said line cache, said first CPU, said first memory device and said second memory device, and that includes:
a first line cache interface that is associated with said first CPU, that receives a first program read request from said first CPU and that generates a first address from said first program read request;
a first memory interface that communicates with said first memory device;
a second memory interface that communicates with said second memory device; and
a switch that selectively connects said line cache to one of said first and second memory interfaces, wherein when said line cache receives said first address, said line cache control system compares said first address to stored addresses in said line cache, returns data associated with said first address if a match occurs, and retrieves said n pages of line cache when said miss occurs.

9. The memory storage system of claim 8 further comprising:
a second CPU;
a second line cache interface that is associated with said second CPU, that receives a second program read request from said second CPU and that generates a second address from said second program read request; and
a line cache arbitration device that communicates with said first and second line cache interfaces and said line cache and that resolves line cache access conflicts between said first CPU and said second CPU.

10. A memory storage system, comprising:
a line cache including a plurality of pages;
a first central processing unit (CPU) that accesses said pages of said line cache;
a first memory device that stores data that is loaded into said line cache when a miss occurs,
wherein after an initial miss, said line cache prevents any additional misses as long as said first CPU addresses sequential memory locations of said first memory device;
a second memory device; and
a line cache control system that controls data flow between said line cache, said first CPU, said first memory device and said second memory device, and that includes:
a first line cache interface that is associated with said first CPU, that receives a first program read request from said first CPU and that generates a first address from said first program read request;
a first memory interface that communicates with said first memory device;
a second memory interface that communicates with said second memory device; and
a switch that selectively connects said line cache to one of said first and second memory interfaces, wherein when said line cache receives said first address, said line cache control system compares said first address to stored addresses in said line cache, returns data associated with said first address if a match occurs, and loads said n pages of said line cache when said miss occurs.

11. The memory storage system of claim 10 wherein when said miss occurs, n pages of said line cache are loaded with data from sequential locations in said first memory device, wherein n is greater than one.

12. The memory storage system of claim 11 wherein when said first CPU requests data from an $m^{th}$ page of said n pages in said line cache, wherein m is greater than one and less than or equal to n, said line cache loads p additional pages with data from sequential locations in said first memory device.

13. The memory storage system of claim 10 further comprising:
a second CPU;
a second line cache interface that is associated with said second CPU, that receives a second program read request from said second CPU and that generates a second address from said second program read request; and
a line cache arbitration device that communicates with said first and second line cache interfaces and said line cache and that resolves line cache access conflicts between said first CPU and said second CPU.

14. A storage system comprising:
a first memory interface;
a second memory interface;
a first memory that communicates exclusively with said first memory interface;
a second memory that communicates exclusively with said second memory interface;
a cache that stores data from said first and second memories and receives a data request from a processor specifying a first address, wherein when requested data corresponding to said first address is present in said cache, said cache provides said requested data to the processor; and
a switch that communicates with said cache, wherein when said requested data is not present in said cache, said switch exclusively connects one of said first memory interface and said second memory interface to said cache, as selected by said first address, whereby said cache retrieves said requested data,
wherein after a first time that said requested data is not present in said cache, n pages of said cache are loaded with data from sequential locations of one of said first and second memories to prevent any additional cache misses for as long as sequential memory locations of said one of said first and second memories are addressed.

15. The storage system of claim 14 wherein said cache translates an address contained within said data request to obtain said first address.

16. The storage system of claim 14 wherein said first memory interface also communicates with the processor via a first direct interface, which bypasses the cache for selected accesses to said first memory.

17. The storage system of claim 16 wherein when said first address is located within said first memory, writes to said first address can only be performed via said first direct interface.

18. The storage system of claim 17 wherein said first memory comprises flash memory, said first direct interface is used to program said first memory, and said cache retrieves data from said first memory interface as a burst.

19. The storage system of claim 16 wherein said second memory interface also communicates with the processor via a second direct interface, which bypasses the cache for selected accesses to said second memory.

20. The storage system of claim 19 wherein when said first address is located within said second memory, writes to said first address can only be performed via said second direct interface.

21. The storage system of claim 14 wherein said cache is comprised of a plurality of lines, and when said requested data is not present in said cache, said cache fills one line with data including said requested data and fills at least one more line with data adjacent to said requested data.

22. A storage system comprising:
a first memory interface;
a second memory interface;
a first memory that communicates exclusively with said first memory interface;
a second memory that communicates exclusively with said second memory interface;
an arbitration module that receives data requests from first and second processors, and processes said data requests into ordered data requests;
a cache that stores data from said first and second memories and receives one of said ordered data requests specifying a first address and associated with one processor of the first and second processors, wherein when requested data corresponding to said first address is present in said cache, said cache provides said requested data to the one processor; and
a switch that communicates with said cache, wherein when said requested data is not present in said cache, said switch exclusively connects one of said first memory interface and said second memory interface to said cache, as selected by said first address, whereby said cache retrieves said requested data,
wherein after a first time that said requested data is not present in said cache, n pages of said cache are loaded with data from sequential locations of one of said first and second memories to prevent any additional cache misses for as long as sequential memory locations of said one of said first and second memories are addressed.

23. The storage system of claim 22 wherein said cache translates an address contained within said ordered data request to obtain said first address.

24. The storage system of claim 22 wherein said first memory interface also communicates with the second processor via a direct interface, which bypasses the cache for selected accesses to said first memory.

25. The storage system of claim 24 wherein when said first address is located within said first memory, writes to said first address can only be performed via said direct interface.

26. The storage system of claim 25 wherein said first memory comprises flash memory, said direct interface is used to program said first memory, and said cache retrieves data from said first memory interface as a burst.

27. The storage system of claim 24 wherein said second memory interface also communicates with the first and second processors via a direct arbitration interface, which bypasses the cache for selected accesses to said second memory.

28. The storage system of claim 27 wherein when said first address is located within said second memory, writes to said first address can only be performed via said direct arbitration interface.

29. The storage system of claim 22 wherein said cache is comprised of a plurality of lines, and when said requested data is not present in said cache, said cache fills one line with data including said requested data and fills at least one more line with data adjacent to said requested data.

* * * * *